US012526569B2

(12) United States Patent
Graff et al.

(10) Patent No.: US 12,526,569 B2
(45) Date of Patent: Jan. 13, 2026

(54) EARPIECES

(71) Applicant: Bose Corporation, Framingham, MA (US)

(72) Inventors: Allen T. Graff, Sutton, MA (US); Andrew Doyle, Brighton, MA (US); Andrew D. Munro, Northborough, MA (US); Donna Marie Sullivan, Millbury, MA (US); Richard Herr, Watertown, MA (US); Benjamin Jason Krosner, Bedford, MA (US)

(73) Assignee: Bose Corporation, Framingham, MA (US)

( * ) Notice: Subject to any disclaimer, the term of this patent is extended or adjusted under 35 U.S.C. 154(b) by 145 days.

(21) Appl. No.: 18/589,374

(22) Filed: Feb. 27, 2024

(65) Prior Publication Data

US 2025/0274695 A1 Aug. 28, 2025

(51) Int. Cl.

| | |
|---|---|
| ***H04R 1/10*** | (2006.01) |
| ***H04R 1/02*** | (2006.01) |
| ***H04R 1/34*** | (2006.01) |

(52) U.S. Cl.

CPC ........... *H04R 1/1075* (2013.01); *H04R 1/023* (2013.01); *H04R 1/1016* (2013.01); *H04R 1/1041* (2013.01); *H04R 1/1083* (2013.01); *H04R 1/345* (2013.01); *H04R 2460/01* (2013.01); *H04R 2460/11* (2013.01)

(58) Field of Classification Search

CPC .... H04R 1/1075; H04R 1/023; H04R 1/1016; H04R 1/1041; H04R 1/1083; H04R 1/345; H04R 2460/01; H04R 2460/11

USPC ........................................................ 381/71.6

See application file for complete search history.

(56) References Cited

U.S. PATENT DOCUMENTS

2022/0167100 A1* 5/2022 Kelly .................. H04R 1/1016
2023/0095933 A1* 3/2023 Higgins ................ H04R 25/02 381/328

FOREIGN PATENT DOCUMENTS

DE 112019005697 T5 * 11/2021 .............. H04W 4/80
WO WO-2024208662 A1 * 10/2024 ........... H04R 1/1075

* cited by examiner

*Primary Examiner* — Sean H Nguyen

(57) ABSTRACT

An earpiece includes an electro-acoustic transducer, a housing that encloses the electro-acoustic transducer, and a nozzle. The nozzle is coupled to the housing and is configured to direct acoustic energy from the transducer toward a user's ear canal when the earpiece is worn. The nozzle defines an inlet opening, an exit opening, and an acoustic pathway extending therebetween. A microphone is disposed within the nozzle and includes a microphone port. A chimney acoustically couples the microphone port to the exit opening and at least partially defines an effective port for the microphone. The inlet opening is closer to the electro-acoustic transducer than the exit opening such that acoustic energy radiated by the electro-acoustic transducer travels from the inlet opening toward the exit opening. The effective port is closer to the exit opening than the microphone port. The effective port is spaced from an exit opening of the nozzle.

25 Claims, 26 Drawing Sheets

232

EARPIECES

BACKGROUND

This disclosure relates to earpieces, and, more particularly, to earpieces with improved feedback active noise reduction (ANR) performance.

SUMMARY

All examples and features mentioned below can be combined in any technically possible way.

In one aspect, an earpiece includes an electro-acoustic transducer, a housing that encloses the electro-acoustic transducer, and a nozzle. The nozzle is coupled to the housing and is configured to direct acoustic energy from the electro-acoustic transducer toward a user's ear canal when the earpiece is worn. The nozzle defines an inlet opening, an exit opening, and an acoustic pathway extending therebetween. A microphone is disposed within the nozzle and includes a microphone port. A chimney acoustically couples the microphone port to the exit opening of the nozzle and at least partially defines an effective port for the microphone. The inlet opening is closer to the electro-acoustic transducer than the exit opening such that acoustic energy radiated by the electro-acoustic transducer travels from the inlet opening toward the exit opening. The effective port is closer to the exit opening than the microphone port. The effective port is spaced from an exit opening of the nozzle.

Implementations may include one of the following features, or any combination thereof.

In some implementations, the earpiece also includes a nozzle mesh that is arranged along the exit opening of the nozzle and the effective port is spaced from the nozzle mesh.

In certain implementations, the earpiece also includes a flexible printed circuit board. The microphone may be mounted on a first surface of the flexible printed circuit board and the chimney may be disposed along a second surface, opposite the first surface, of the flexible printed circuit board.

In some cases, a stiffener plate is disposed between the second surface of the flexible printed circuit board and the chimney.

In certain cases, the flexible printed circuit board includes an aperture that aligns with the microphone port and the stiffener plate includes a hole that is aligned with the aperture on the flexible printed circuit board. The hole and the aperture acoustically couple the microphone port to an acoustic channel defined by the chimney.

In some examples, a mesh is mounted on a surface of the stiffener plate opposite the flexible printed circuit board and overlying the hole.

In certain examples, the chimney includes a sidewall and a top plate. The sidewall, the top plate, and the stiffener plate together define the acoustic channel and a chimney opening that acoustically couples the microphone port to the external environment outside of the housing.

In some implementations, the sidewall extends three-quarters around the hole in the stiffener plate.

In certain implementations, the sidewall is U-shaped.

In some cases, the sidewall is secured to the stiffener plate via a first layer of pressure sensitive adhesive.

In certain cases, the sidewall is secured to the top plate via a second layer of pressure sensitive adhesive.

In some examples, the sidewall is integrally formed with the top plate.

In certain examples, a recess is formed in a wall of the nozzle and the recess at least partially defines the chimney.

In some implementations, the nozzle is configured to receive and support a compliant eartip.

In certain implementations, the microphone is a feedback microphone for a feedback active noise reduction (ANR) system.

In some cases, the microphone is an error microphone for an adaptive feedforward active noise reduction (ANR) system.

In certain cases, the chimney includes a first acoustic channel that extends between the microphone port and the exit opening and a second acoustic channel that extends between the microphone port and the electro-acoustic transducer.

In another aspect, an earpiece includes an electro-acoustic transducer, a housing enclosing the electro-acoustic transducer, and a nozzle. The nozzle defines an exit opening for directing acoustic energy from the electro-acoustic transducer toward a user's ear canal when the earpiece is worn through the exit opening. A microphone is disposed within the nozzle and includes a microphone port. A chimney acoustically couples the microphone port to the exit opening. The chimney includes a sidewall and a top plate which together at least partially define an effective port for the feedback microphone. The effective port is closer to the exit opening than the microphone port.

Implementations may include one of the above and/or below features, or any combination thereof.

In some implementations, the top plate is substantially planar.

In certain implementations, the sidewall and the top plate are integrally formed.

In some cases, the sidewall and the top plate are secured together via adhesive.

In certain cases, the sidewall extends partway around a perimeter of the top plate.

In some examples. The earpiece also includes a printed circuit board. The microphone may be mounted along a first surface of the printed circuit board and the chimney may be mounted along a second, opposite surface of the printed circuit board.

In certain examples, the circuit board is a flexible printed circuit board.

In some implementations, a stiffener plate is disposed along the second surface of the flexible printed circuit board and the chimney is mounted on the stiffener plate.

DETAILED DESCRIPTION

Commonly labeled components in the FIGURES are considered to be substantially equivalent components for the purposes of illustration, and redundant discussion of those components is omitted for clarity. Numerical ranges and values described according to various implementations are merely examples of such ranges and values and are not intended to be limiting of those implementations. In some cases, the term "about" may be used to modify values, and in these cases, can refer to that value +/− a margin of error, such as a measurement error, which may range from up to 1-5 percent.

There is a desire to make in-ear headphones as small as possible. The ability to reduce the size of conventional in-ear headphones can be hindered by the components they include. Some in-ear headphones offer feedforward and/or feedback noise cancellation. Headphones that offer feedback noise cancellation often locate a feedback microphone in a narrow portion (aka "nozzle") of a housing that is designed to extend toward, and, in some cases, into a user's ear canal. Sizing adjustments that reduce the size of the nozzle can negatively impact ANR performance.

This disclosure is based, at least in part, on the belief that adverse impact to feedback ANR performance attributable to a reduction of nozzle size may be mitigated by moving an effective position of the feedback microphone input closer to the user's ear canal. In that regard, a chimney structure that moves the effective location of an input port of a feedback microphone closer to the exit opening of a nozzle might help to mitigate adverse impact to feedback ANR performance attributable to a reduction in nozzle size.

This disclosure is also based, at least in part, on the belief that providing a chimney structure that locates an effective input port to a feedback microphone at or close to the outlet end of a nozzle can help to mitigate feedback ANR instability that might occur when and if the nozzle is blocked. The rationale is, if the chimney is extended to the outlet end of the nozzle and the nozzle is blocked, then there is decreased coupling between the driver (aka "electro-acoustic transducer") and the feedback microphone, and, as a result, a lower likelihood that the feedback ANR system would become unstable.

Figure 1:
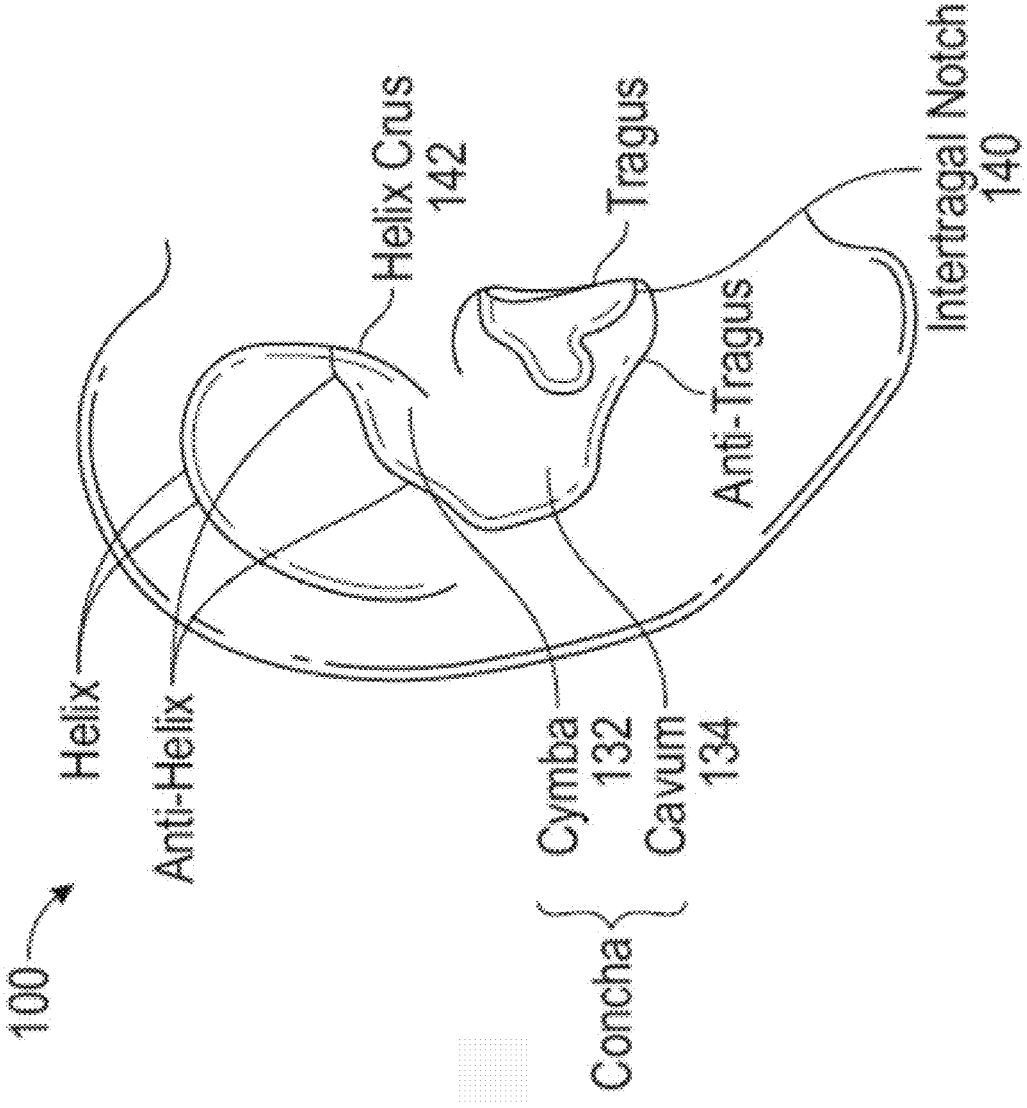
FIG. 1 is a view of the lateral surface of the human ear.

FIG. 1 shows the lateral surface of a human right ear, with some features identified. There are many different ear sizes and geometries. Some ears have additional features that are not shown in FIG. 1. Some ears lack some of the features that are shown in FIG. 1. Some features may be more or less prominent than are shown in FIG. 1.

FIGS. 2A-2H illustrate an exemplary earpiece 200 for the right ear of a user. A mirror-image of the design would be used for an earpiece for the left ear. The earpiece 200 includes an earbud 202, an ear tip 204, and a retaining piece 206. The earbud 202 includes a housing 208 having a first housing portion 210, a second housing portion 212, and a third housing portion (cap) 214 that together define an acoustic module 216 and an electronics module 218. The ear tip 204 provides an acoustic seal with a user's ear when the earpiece 200 is used. The retaining piece 206 engages the user's antihelix when the earpiece is worn to assist with retaining the earpiece in the user's ear. The first, second, and third housing portions 210, 212, 214 may be formed of Polycarbonate, Polycarbonate/acrylonitrile butadiene styrene (PC/ABS), or Nylon and may be secured together via an adhesive.

Figure 2A:
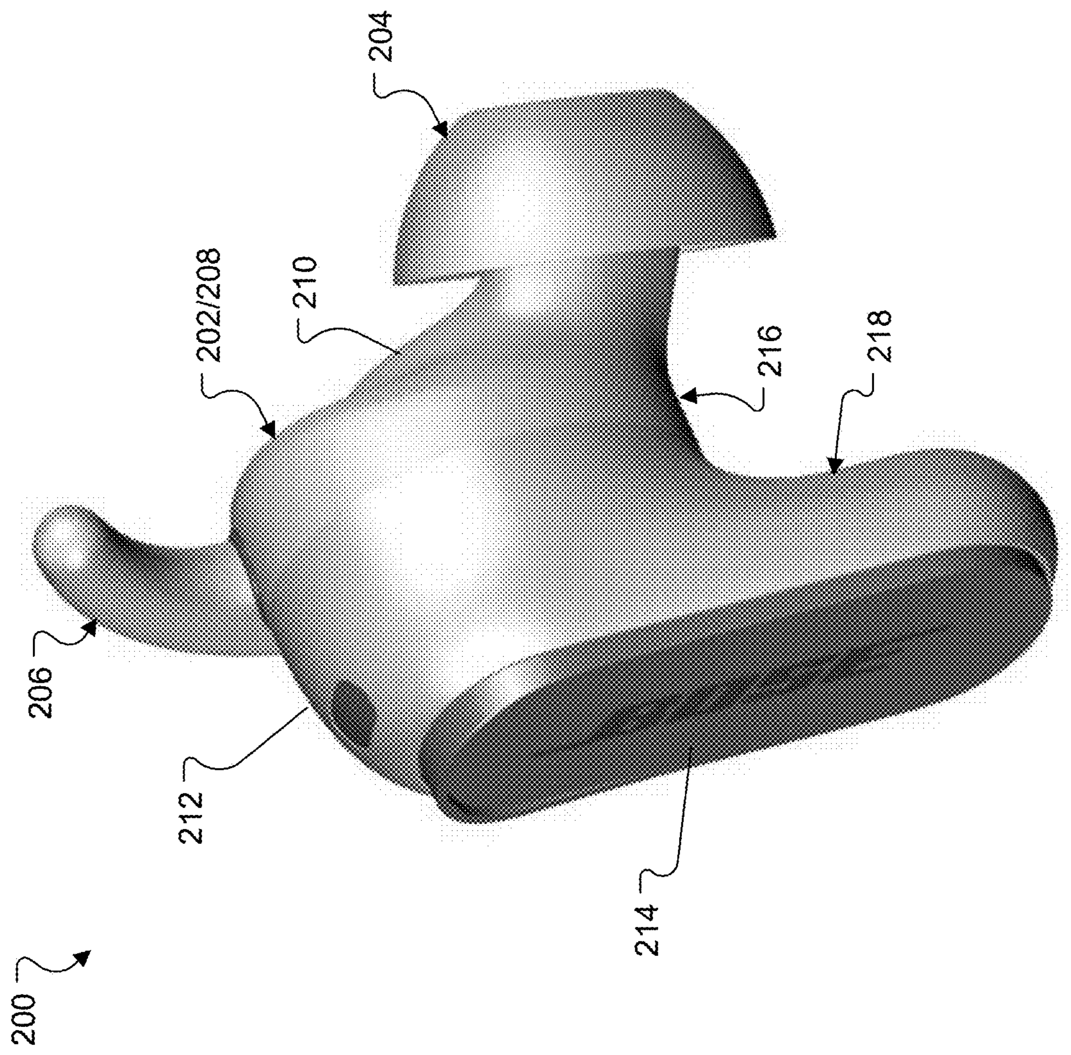
FIG. 2A is a perspective view of an earpiece.
Figure 2B:
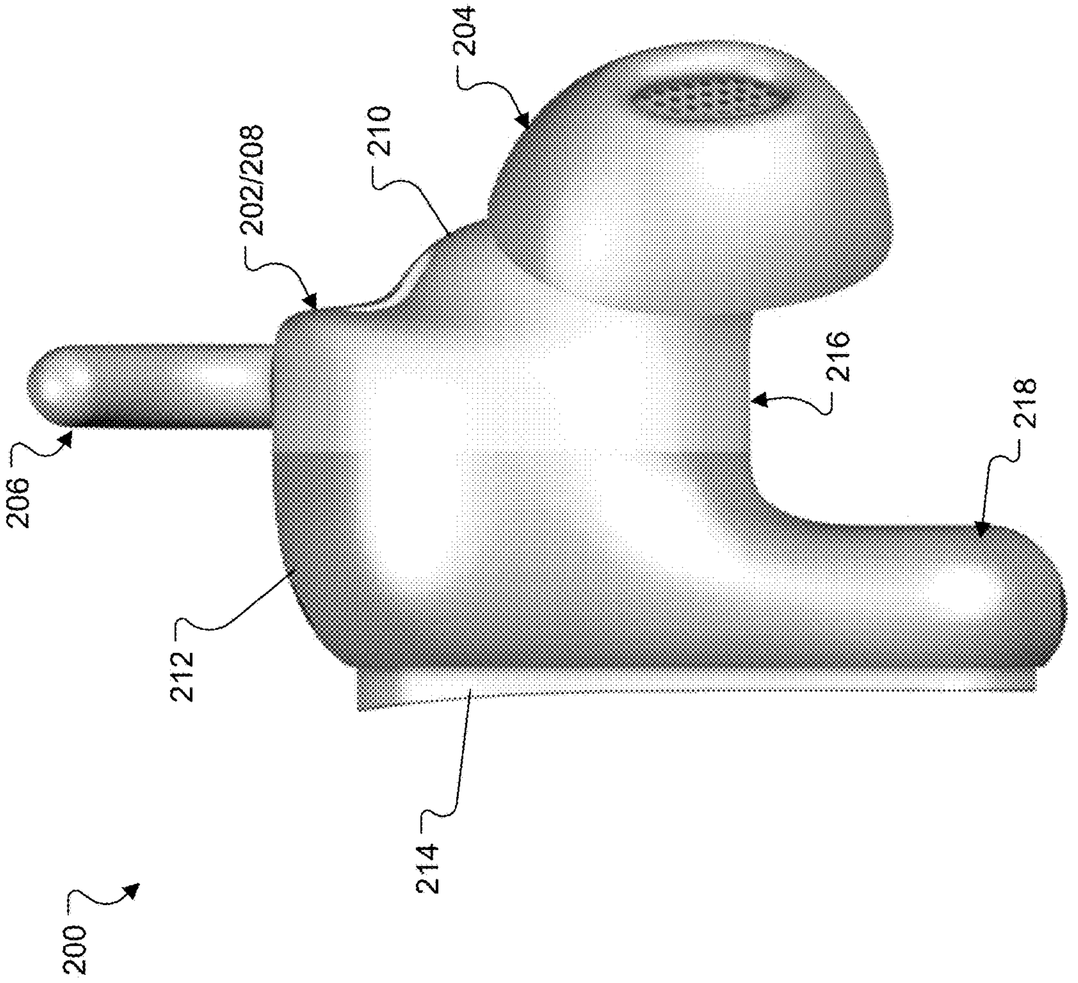
FIGS. 2B through 2G are front, rear, left side, right side, top and bottom views, respectively, of the earpiece of FIG. 2A.
Figure 2C:
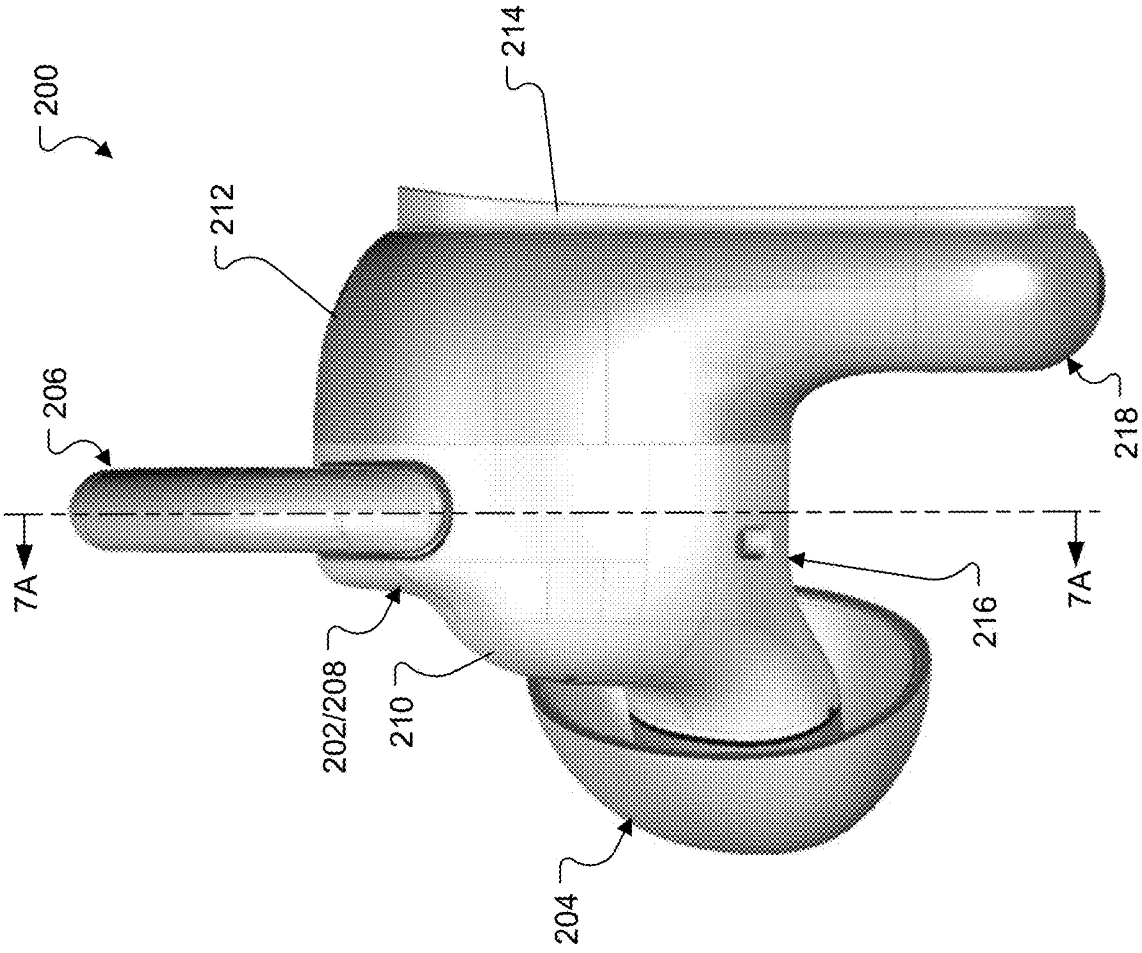
Figure 2D:
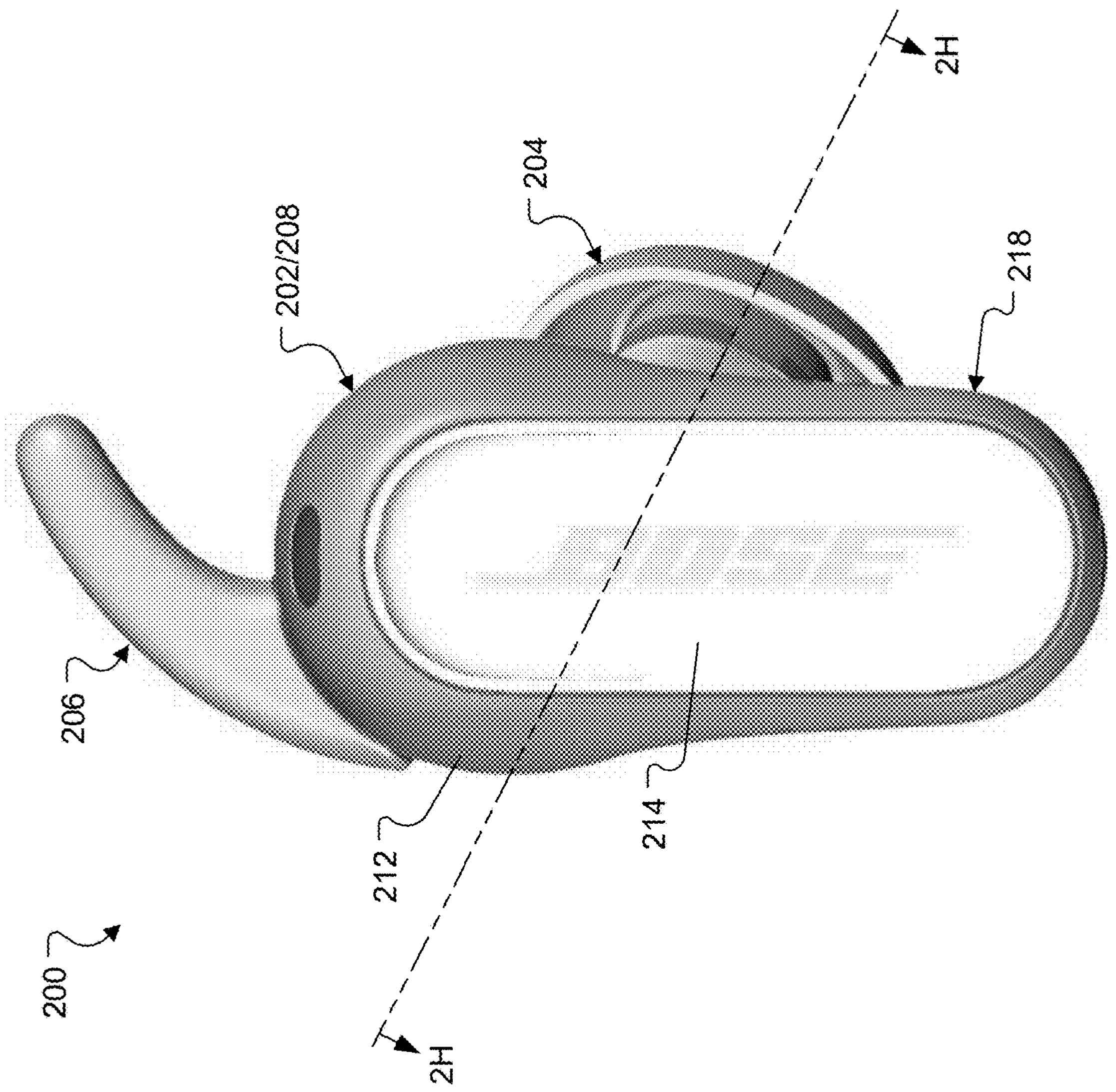
Figure 2E:
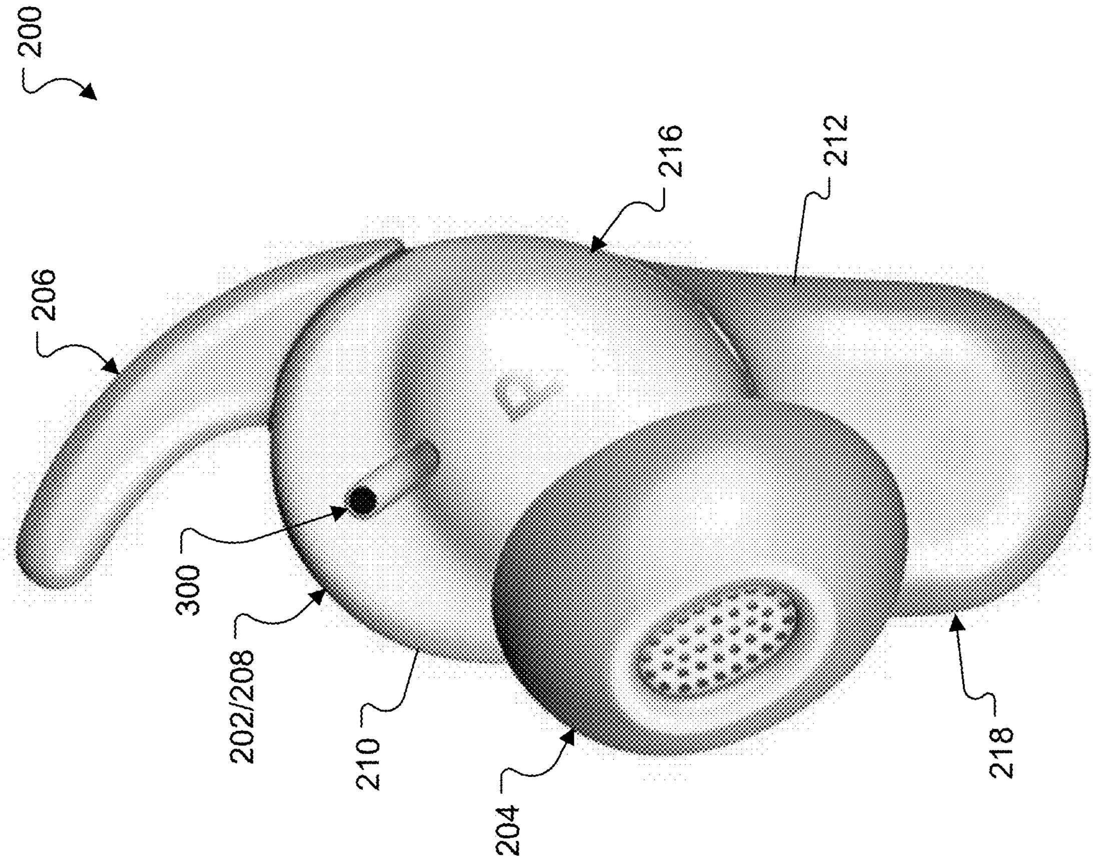
Figure 2F:
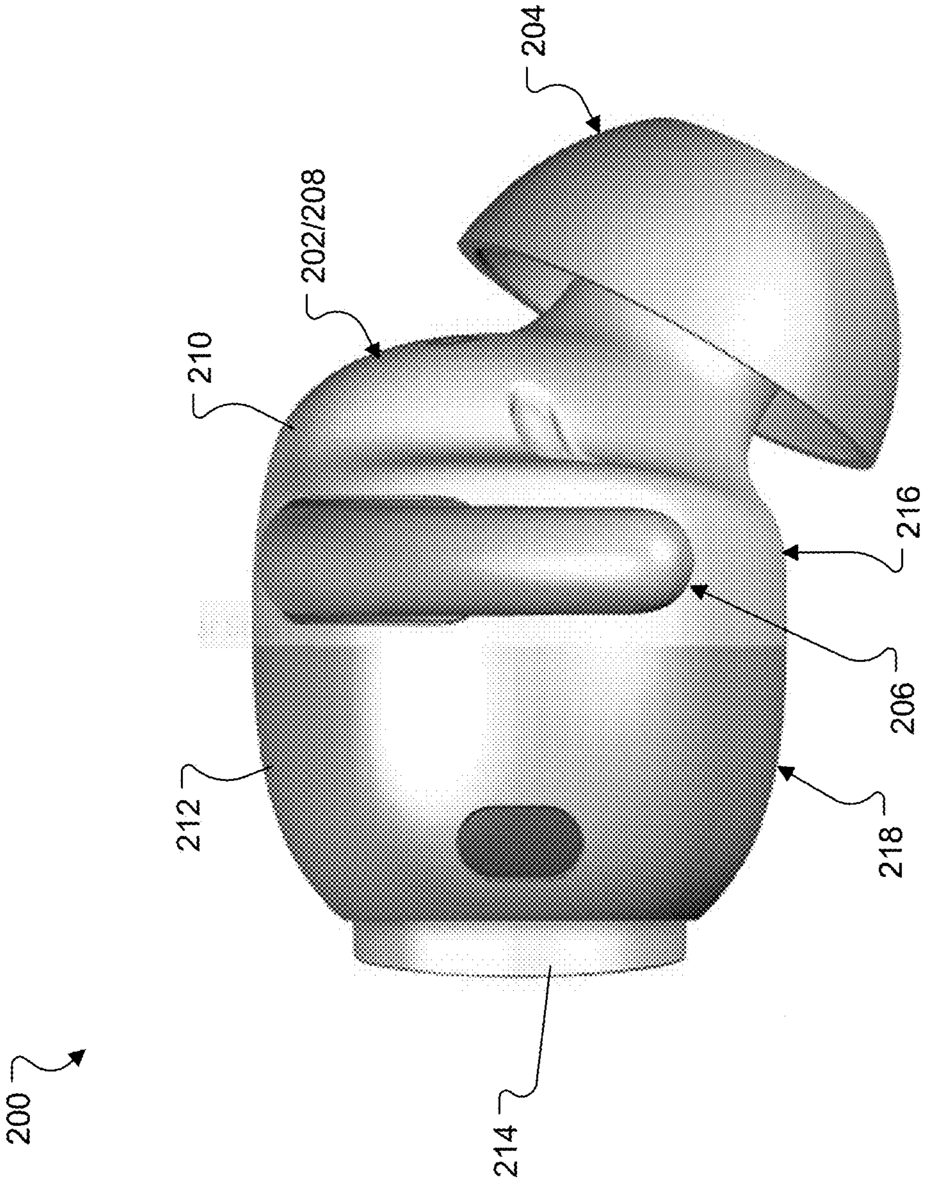
Figure 2G:
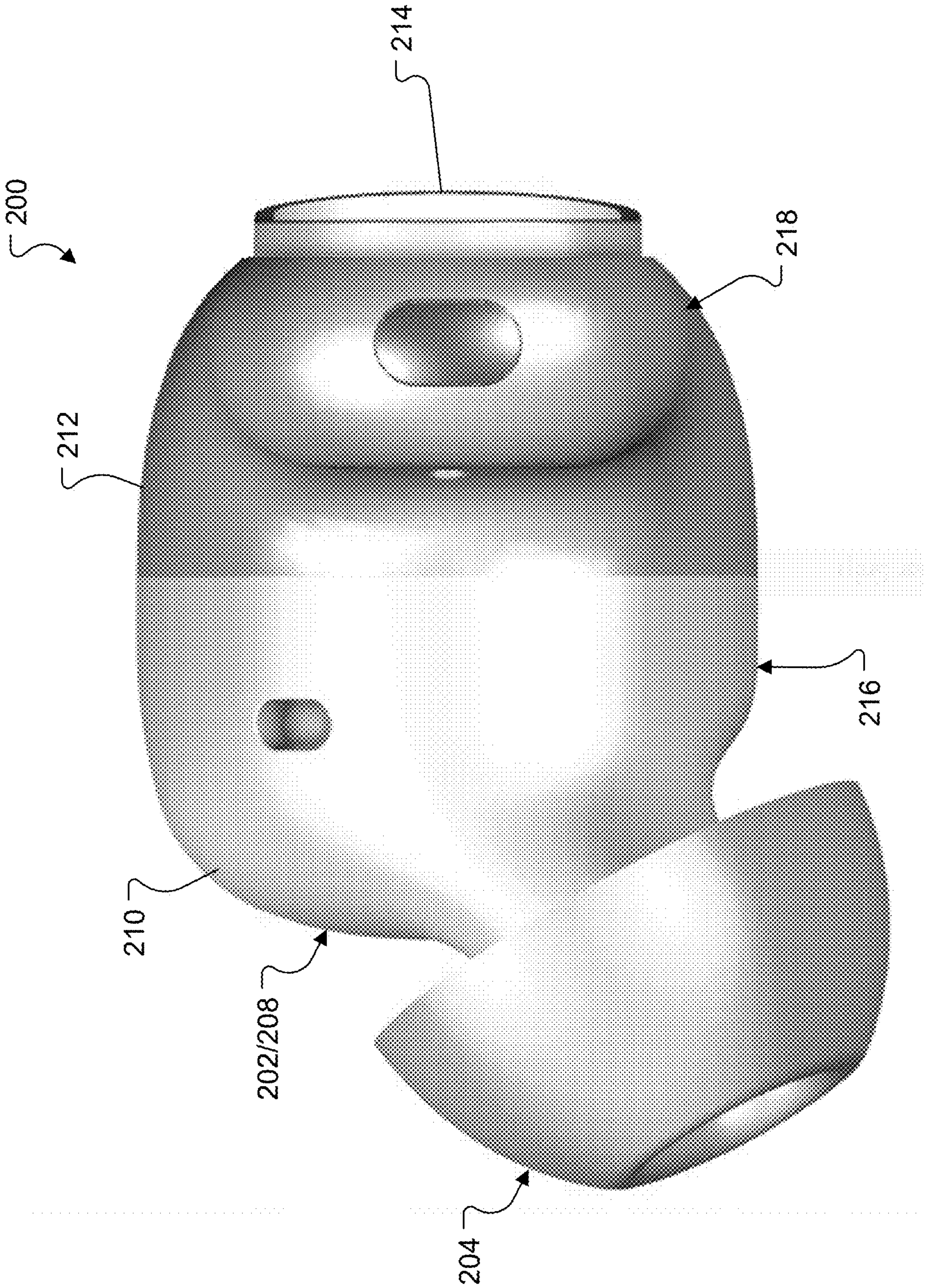
Figure 2H:
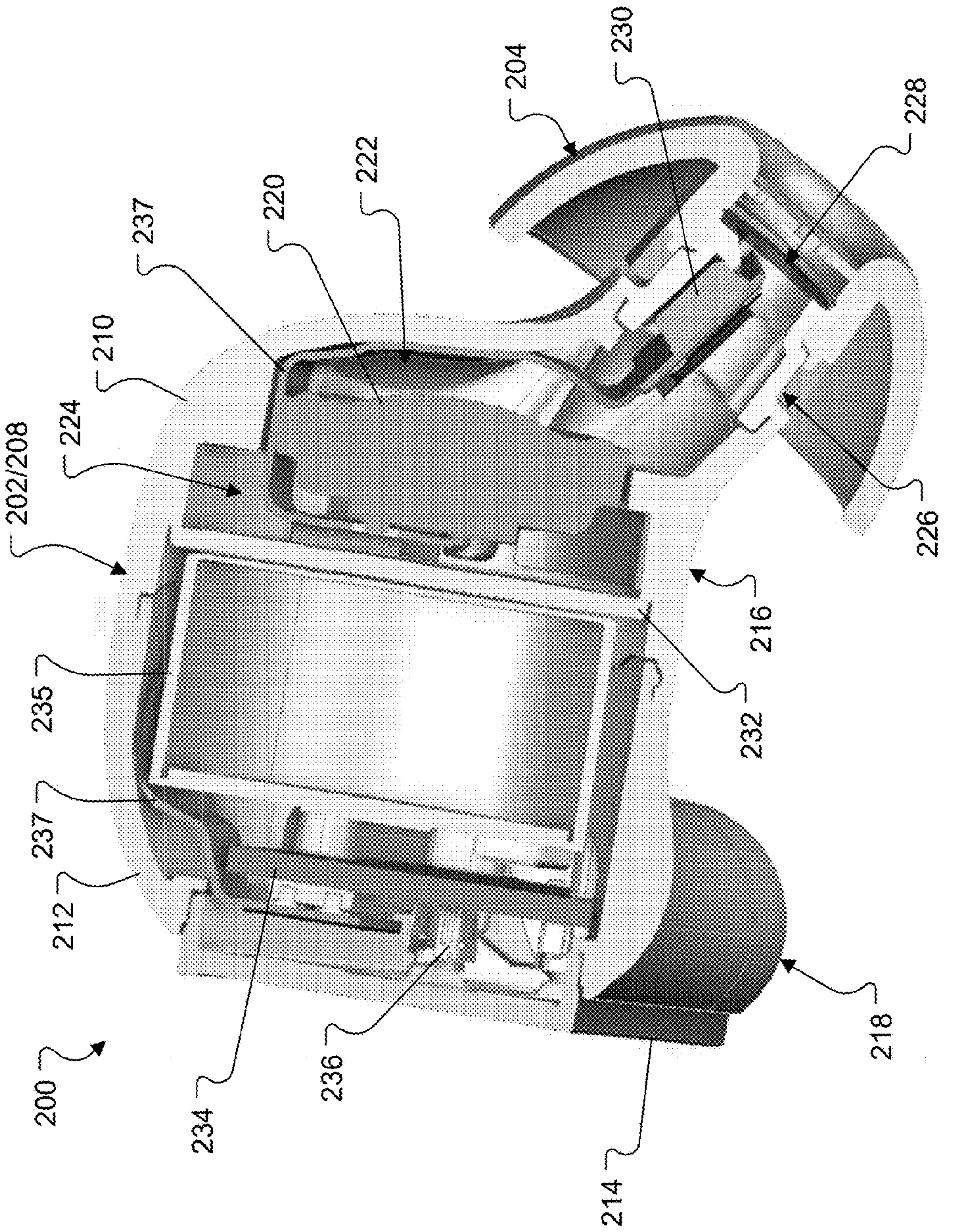
FIG. 2H is a sectional view of the earpiece of FIG. 2A taken along line 2H-2H in FIG. 2D.

With reference to FIG. 2H, the acoustic module 216 contains/houses an electro-acoustic transducer 220 that divides the acoustic module 216 into a first (front) acoustic cavity 222 and a second (rear) acoustic cavity 224. A first (front) side of the electro-acoustic transducer 220 radiates acoustic energy into the fist acoustic cavity 222 and a second (rear) side of the electro-acoustic transducer 220 radiates acoustic energy into the second acoustic cavity 224. A nozzle 226 is coupled to the housing 208 and is configured to direct acoustic energy from the first acoustic cavity 222 to a nozzle exit opening 228. An exterior surface of the nozzle 226 supports the ear tip 204. In some cases, a microphone 230, e.g., a feedback microphone for feedback noise cancellation, may be located within the nozzle 226. In some cases, the nozzle 226 may be formed integrally with the housing 208. For example, the nozzle 226 may be defined by the first housing portion 210. Alternatively, or additionally, the nozzle 226 may be formed, in whole or in part, as a separate housing portion and may be attached to the first housing portion 210, e.g., via an adhesive.

Figure 3A:
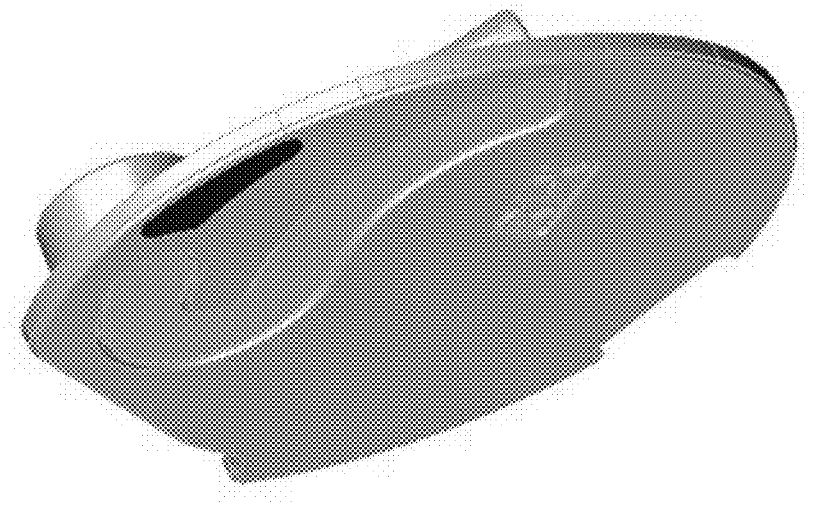
FIGS. 3A and 3B are perspective views of an internal dividing plate of the earpiece of FIG. 2A.
Figure 3B:
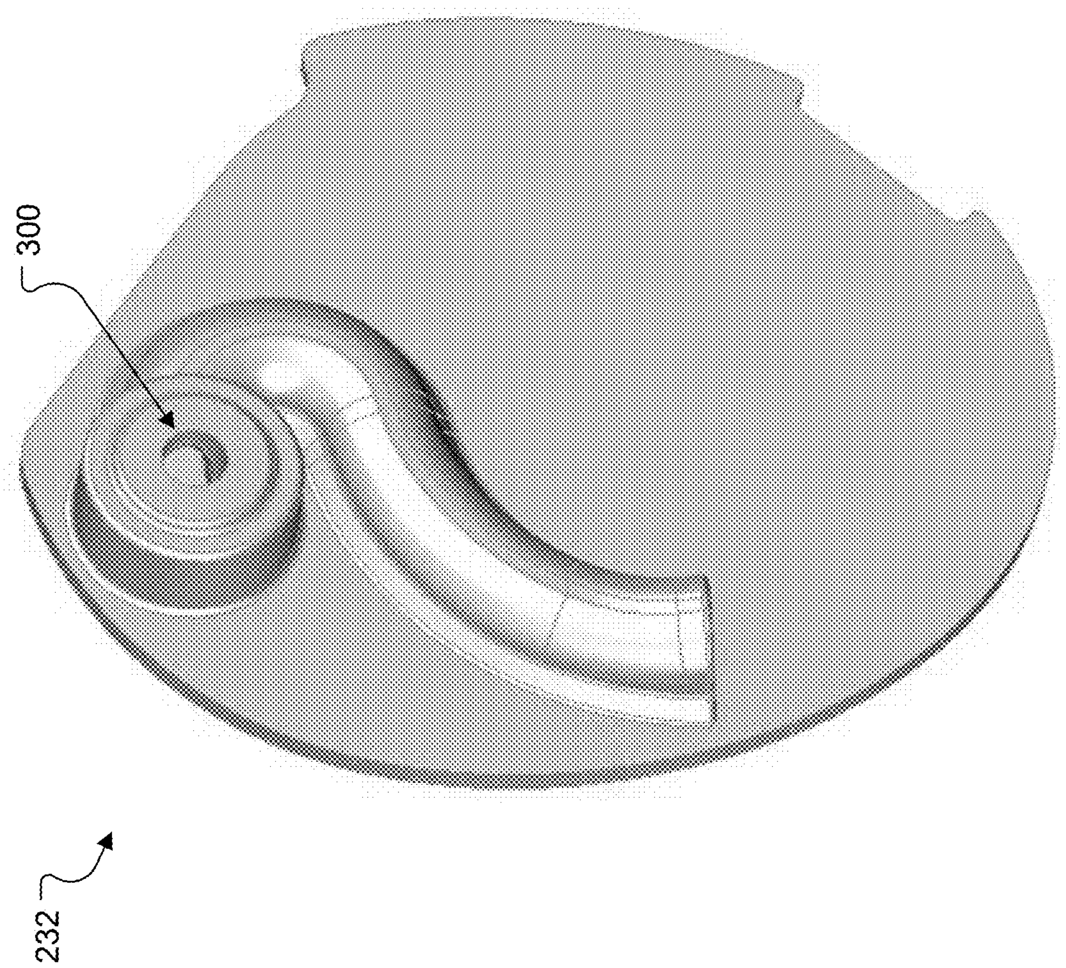

In the illustrated example, an internal dividing plate 232 is arranged between the second acoustic cavity 224 and the electronics module 218 and separates the acoustic module 216 from the electronics module 218. With reference to FIGS. 3A & 3B, the internal dividing plate 232 may also help to define an acoustic port 300 (e.g., a mass port) between the second acoustic cavity 224 and the external environment outside of the housing 208. Additional details regarding the internal dividing plate may be found in U.S. Pat. No. 11,638,081, titled "Earphone Port," which issued on Apr. 25, 2023. The complete disclosure of U.S. Pat. No. 11,638,081 is incorporated herein by reference.

Referring again to FIG. 2H, the electronics module 218 houses electronics for driving the electro-acoustic transducer 220. The electronics include a printed circuit board 234 that may support various electronic components (e.g., microprocessor, wireless transceiver, power management circuitry, digital signal processor (DSP)), a power source (e.g., a battery 235), one or more sensors (e.g., electrode(s) 400*b* (FIG. 4B) for a primary capacitive sensor 404), one or more electrical connectors, one or more microphones, and wiring (e.g., flexible printed circuit board 237) that electrically connects the electronics together and with the electro-acoustic transducer 220 and feedback microphone.

Figure 4A:
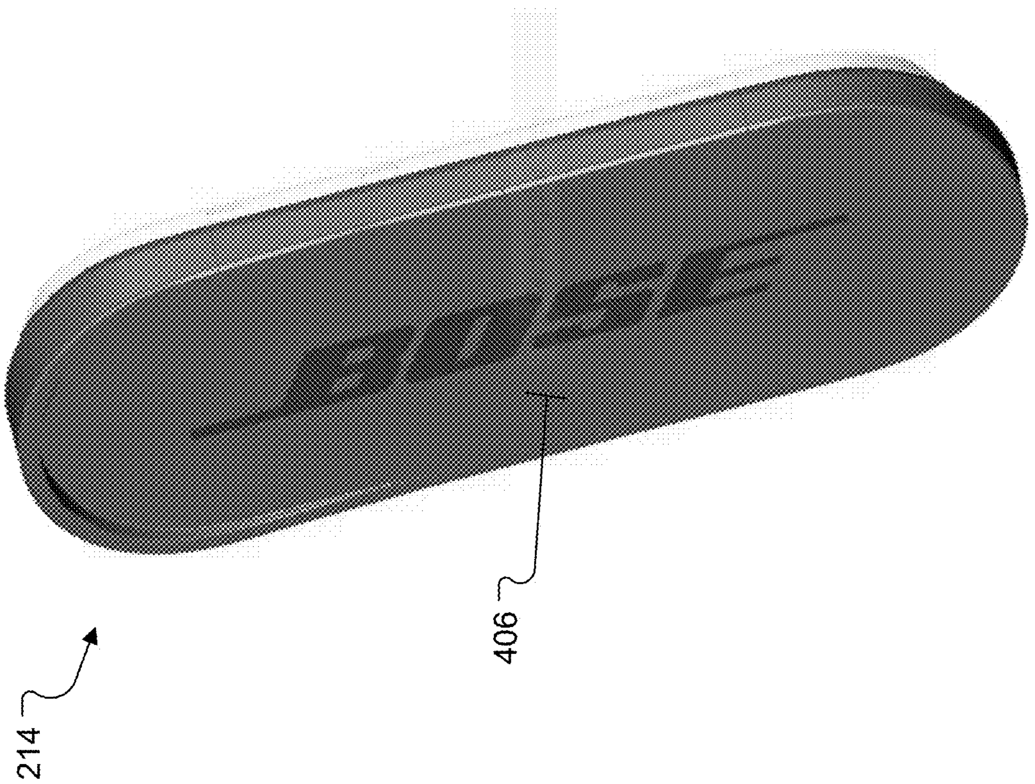
FIGS. 4A and 4 B are perspective views of a third housing portion of the earpiece of FIG. 2A.
Figure 4B:
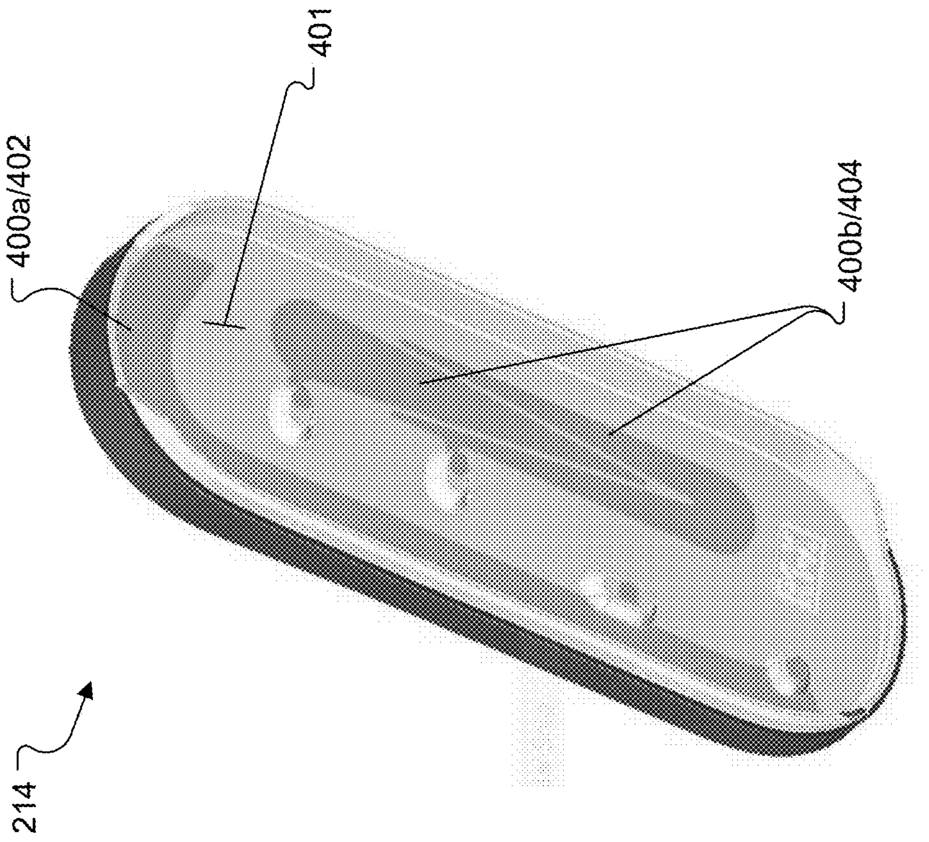

Referring to FIGS. 4A & 4B, the third housing portion 214 may carry electrically conductive traces 400*a*, 400*b* (generally "400") that may be formed directly on an inner surface of the third housing portion 214 (e.g., via laser direct structuring (LDS)). The traces 400 may form an antenna 402 for wireless communication and/or the traces 400 may form one or more electrodes for capacitive sensor 404. The traces 400 may be electrically connected to the printed circuit board 234 (FIG. 2H) via spring contacts 236 (FIG. 2H) mounted on the printed circuit board 234 that contact the traces 400 when the housing 208 is assembled. Additional details regarding the forming of an antenna or capacitive sensor electrodes using LDS on a cap of an earbud housing can be found in U.S. Pat. No. 11,115,745, titled "Systems and methods for antenna and ground plane mounting schemes for in-ear headphone," which issued Sep. 7, 2021. The complete disclosure of U.S. Pat. No. 11,115,745 is incorporated herein by reference.

FIGS. 5A-5D show an exemplary feedback microphone assembly 500. The feedback microphone assembly 500 includes the feedback microphone 230 and a flexible printed circuit board 502 (aka "flexible printed circuit" or "FPC") that electrically connects the feedback microphone 230 to the printed circuit board 234 (FIG. 2H). The feedback (fb) microphone 230 is mounted on a first surface of a flexible printed circuit board 502. The flexible printed circuit board 502 includes an aperture 504 (FIG. 5D) that aligns with a port 506 (FIG. 5D) on the feedback microphone 230. A stiffener plate 508 is mounted (e.g., via adhesive, such as a pressure sensitive adhesive (PSA)) on a second, opposite surface of the flexible printed circuit board 502. The stiffener plate 508 adds rigidity to the flexible printed circuit board 502. The stiffener plate 508 is made of a rigid material (e.g., metal). The stiffener plate 508 includes a hole 510 (FIG. 5D) that is aligned with the aperture 504 on the flexible printed circuit board 502. A mesh 512 is mounted on a surface of the stiffener plate 508 opposite the flexible printed circuit board 502 with an adhesive 514 (e.g., pressure sensitive adhesive (PSA)).

Notably, the feedback microphone assembly 500 also includes a chimney 516 that is mounted on the second surface of the stiffener plate 508 and extends over the mesh 512. The chimney 516 provides a known or a controllable enclosed air volume that makes the feedback microphone 230 seem like it is further in and closer to the user's eardrum. When it comes to feedback active noise reduction (ANR) performance, having the feedback microphone 230 closer to the eardrum can enable a more accurate measurement of what the user is actually hearing, and, therefore, can help to enable better feedback ANR response to cancel out the noise. In some cases, the microphone may, in addition or alternatively, be used as an error microphone for an adaptive feedforward ANR system. In which case, similar benefits might be achieved. E.g., a better approximation of the error at the ear drum.

In one implementation, the chimney 516 consists of a sidewall 518 that extends three-quarters around the mesh 512 and defines the effective height of the chimney; a first pressure sensitive adhesive (PSA) layer 520 that secures a first surface of the sidewall 518 to the stiffener plate 508; a top plate 522; and a second PSA layer 524 that secures a second, opposite surface of the top plate 522 to the sidewall 518.

Figure 5A:
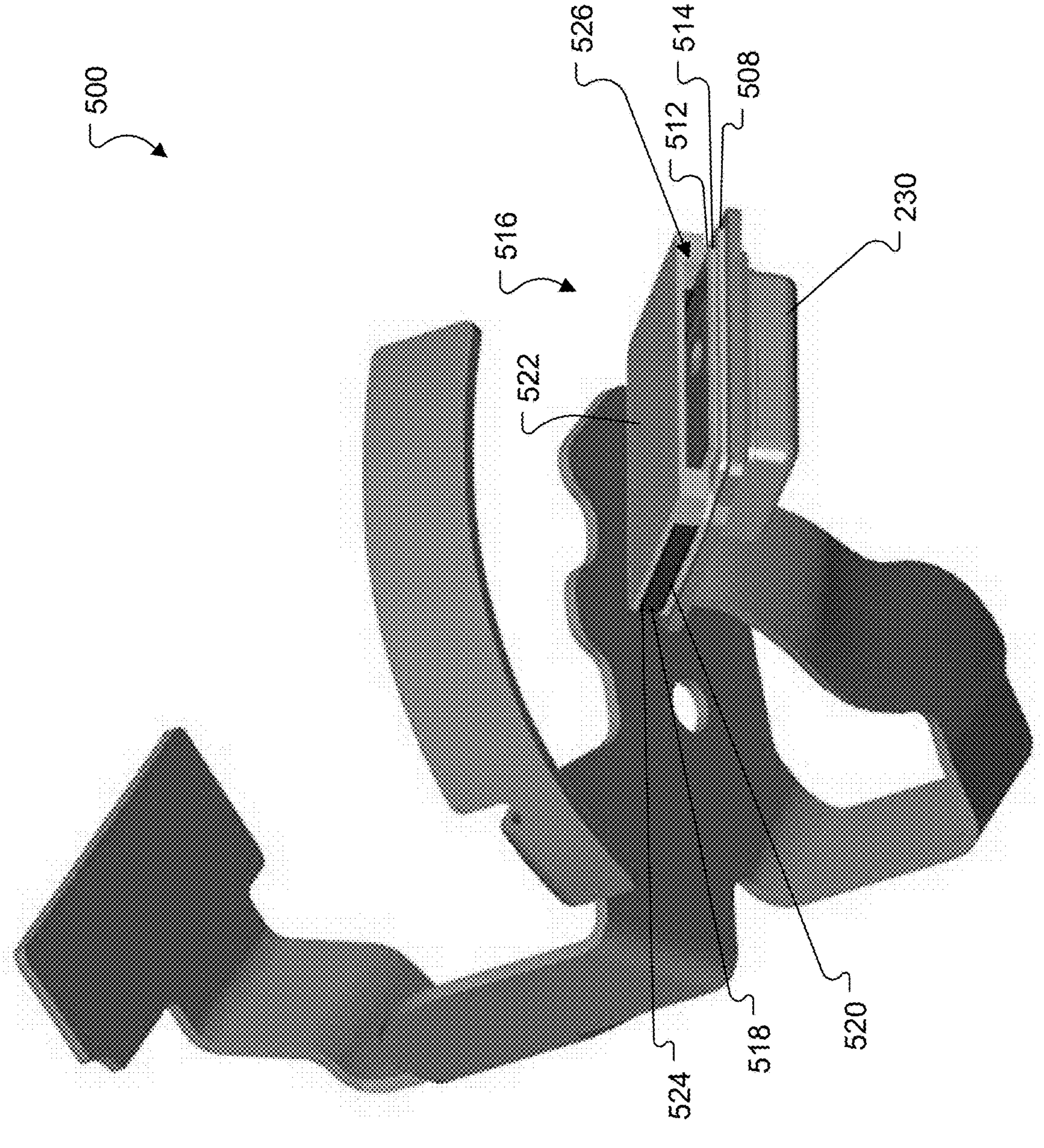
FIGS. 5A and 5B are perspective views of a feedback microphone assembly of the earpiece of FIG. 2A.
Figure 5B:
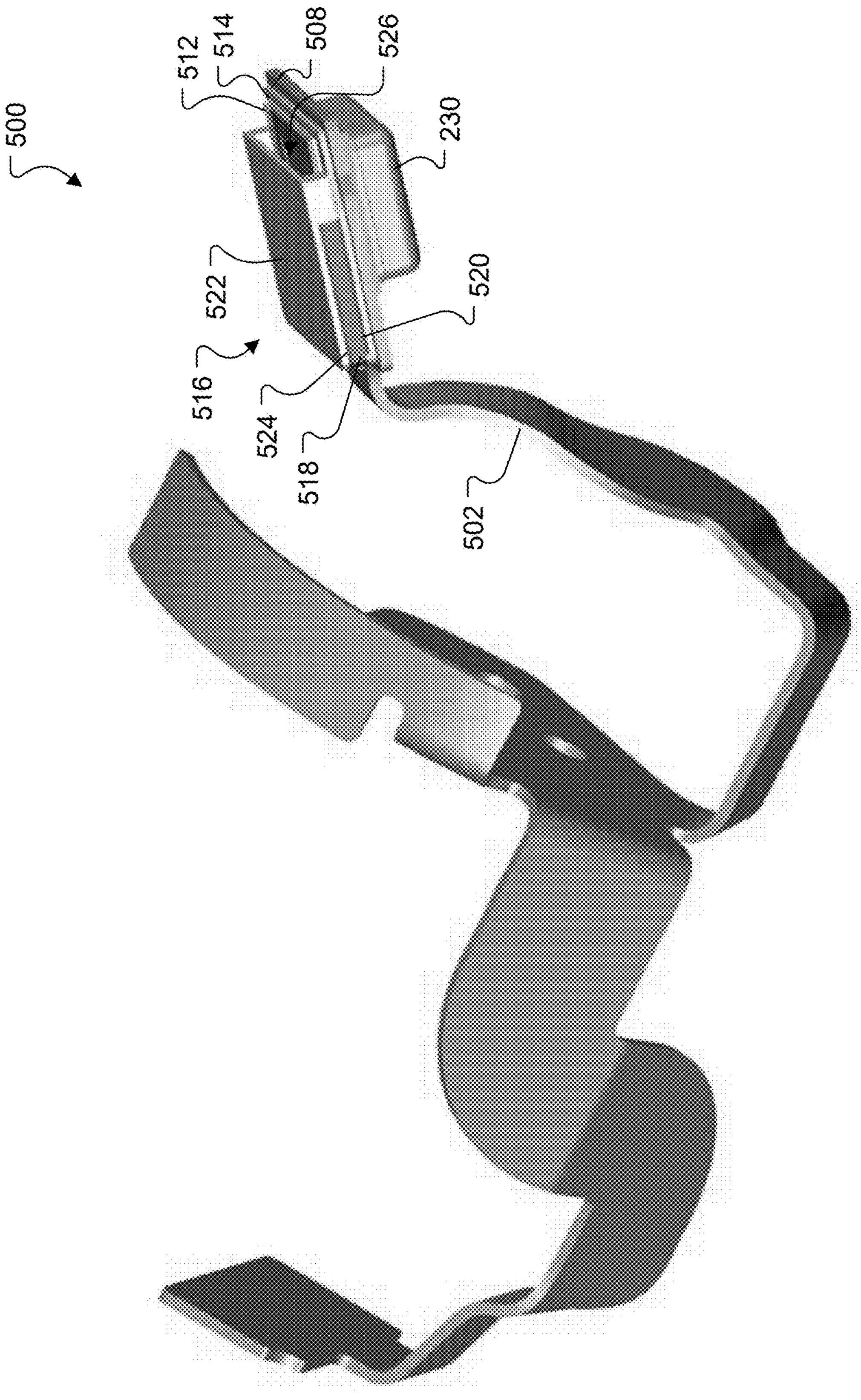
Figure 5C:
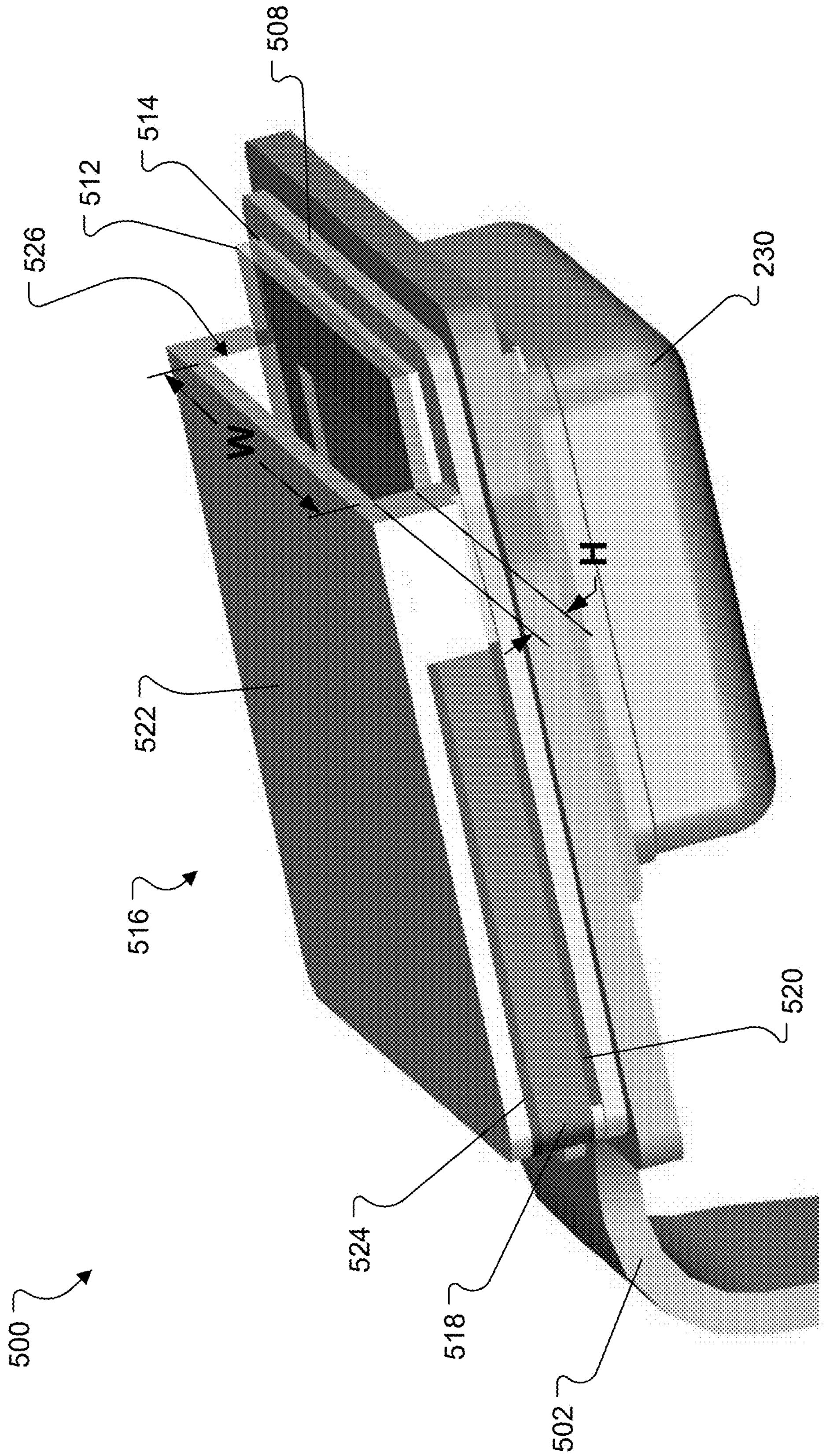
FIG. 5C is a detailed view of a microphone and chimney sub-assembly from the feedback microphone assembly of FIG. 5A.
Figure 5D:
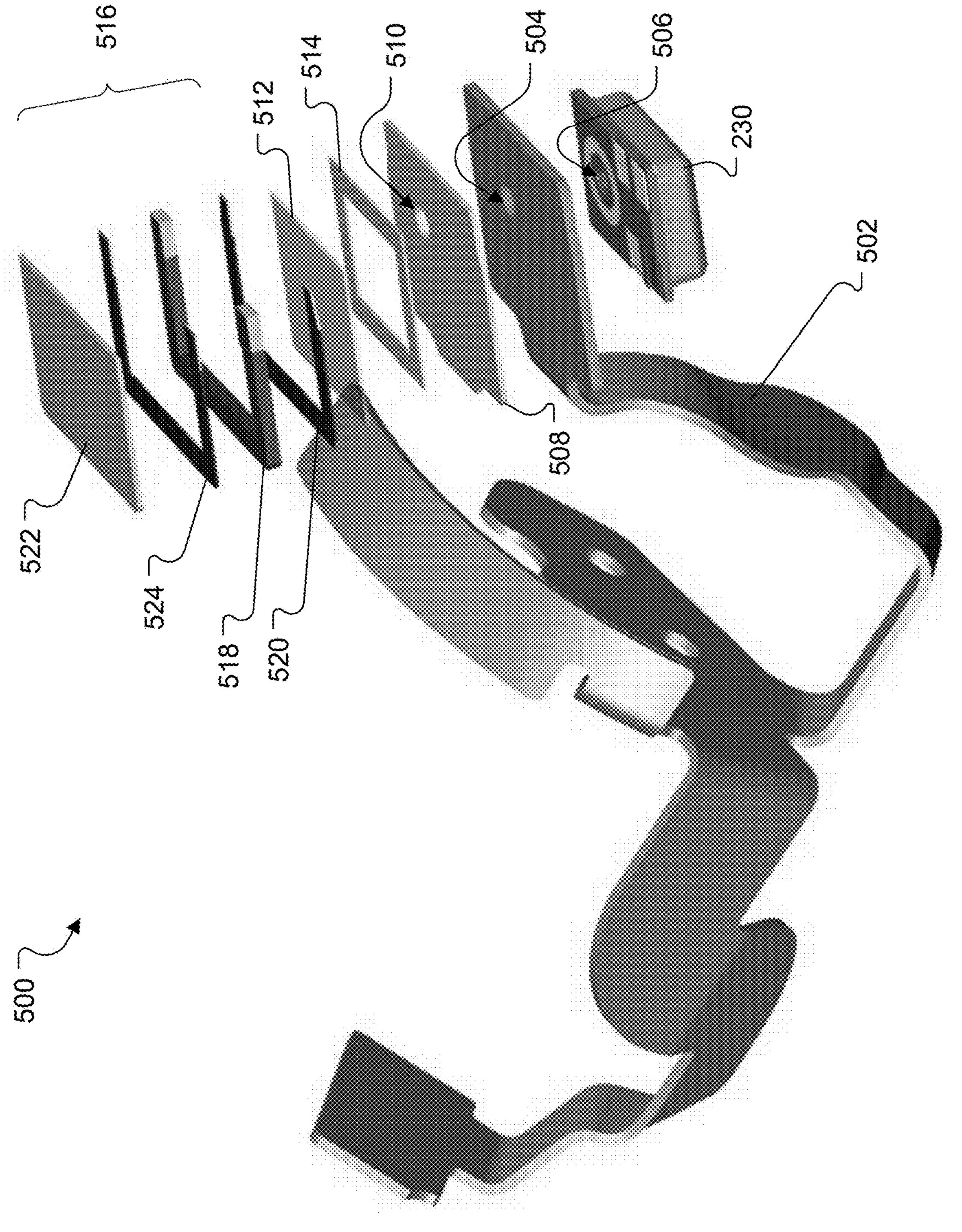
FIG. 5D is an exploded perspective view of the feedback microphone assembly of FIG. 5A.

The top plate 522, sidewall 518, and stiffener plate 508 define an acoustic channel above the mesh 512/microphone port 506 and define an opening 526 for coupling the feedback microphone port 506 to the environment. With reference to FIG. 5C, the acoustic channel may have a height (H) of about 0.18 mm to about 0.70 mm, e.g., 0.35 mm, a width (W) of about 1.87 mm to about 7.4 mm, e.g., 3.70 mm, and an effective length (L) of about 0.50 mm to about 2.00 mm, e.g., about 1.45 mm (see also FIG. 6E). The effect length (L) is measured from the center of the microphone port 506 to the opening 526. The opening 526 is arranged substantially orthogonally to the feedback microphone port 506.

Figure 6A:
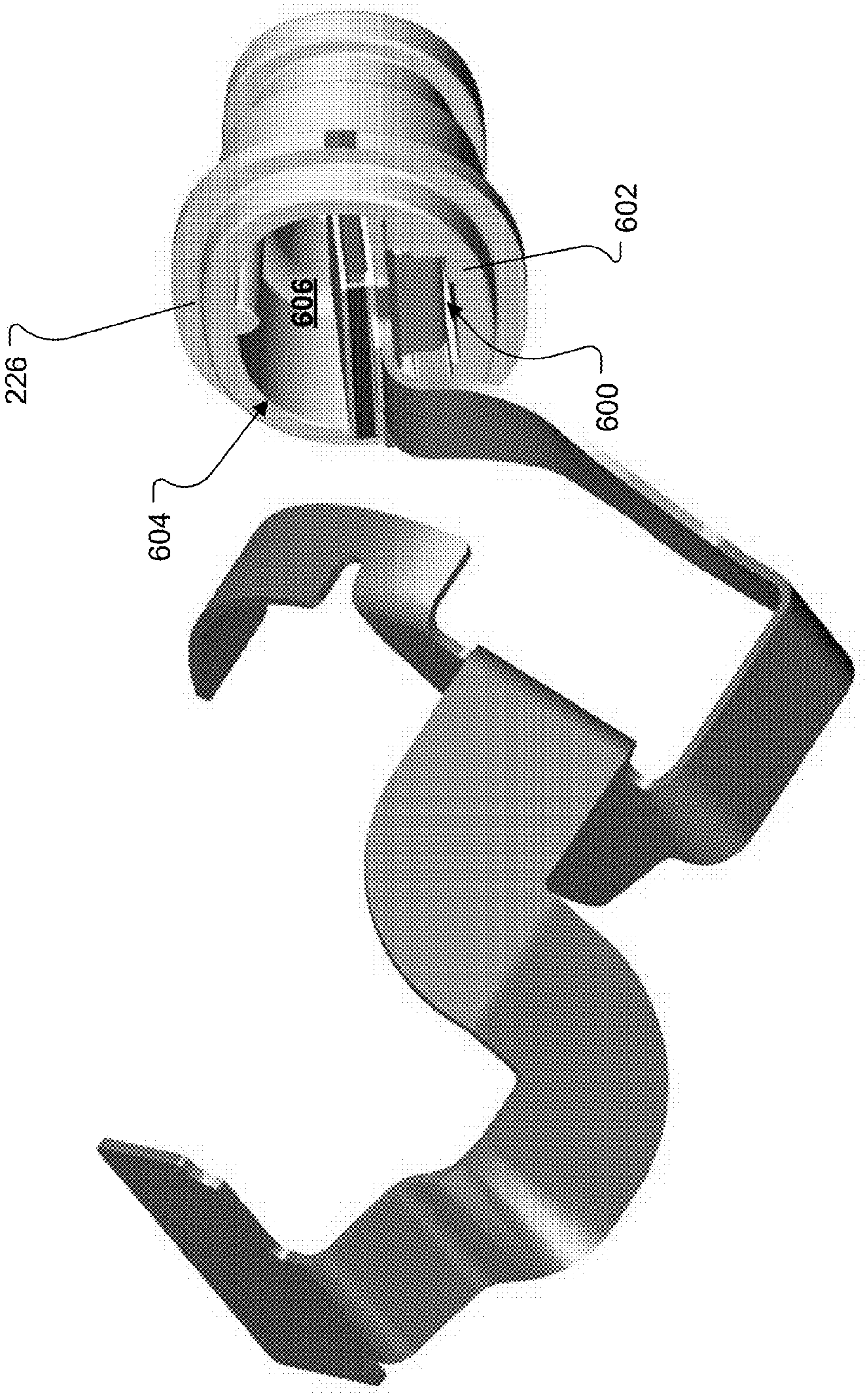
FIGS. 6A through 6D are various views showing the microphone sub-assembly of FIG. 5C mounted in a nozzle of the earpiece of FIG. 2A.
Figure 6B:
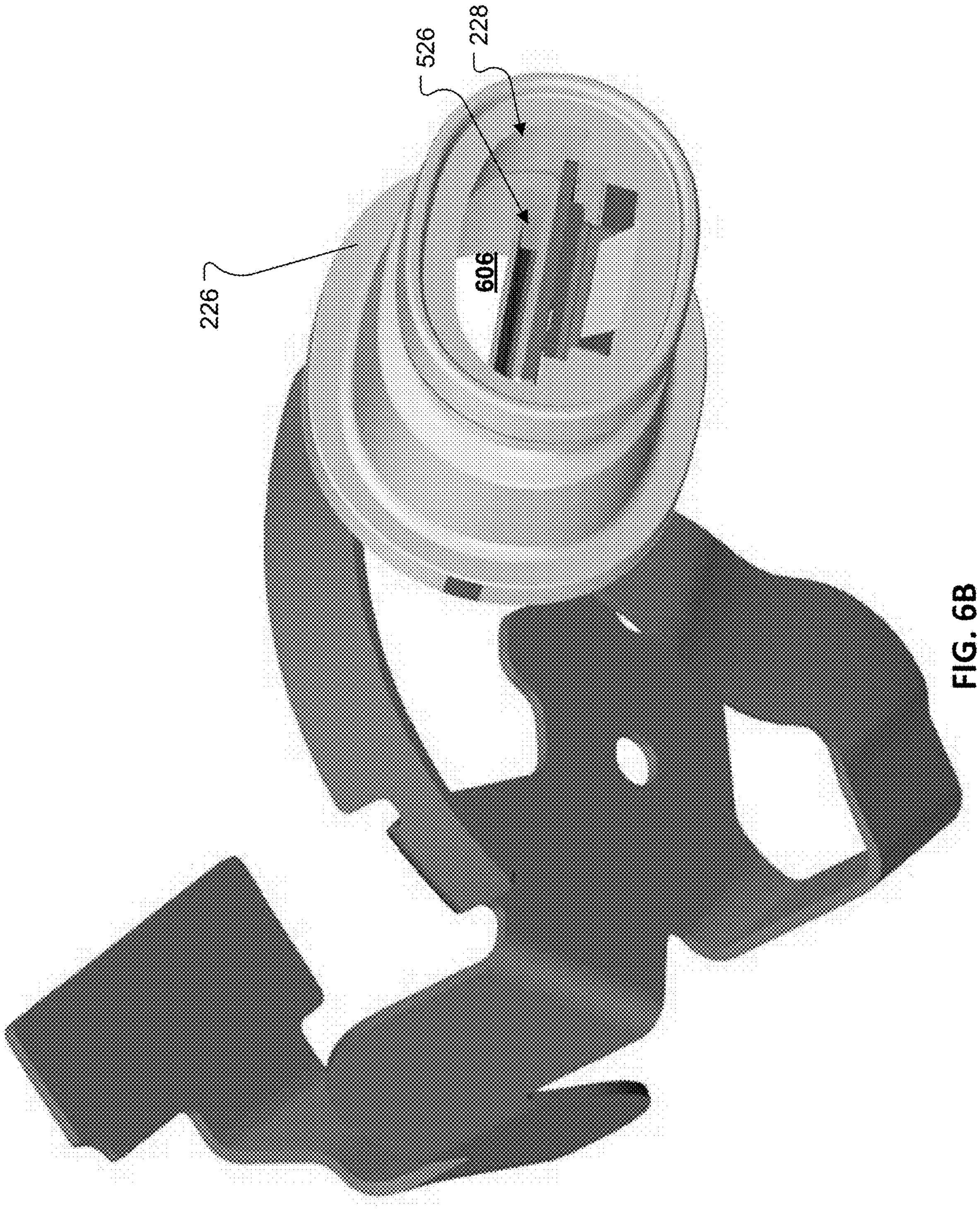
Figure 6C:
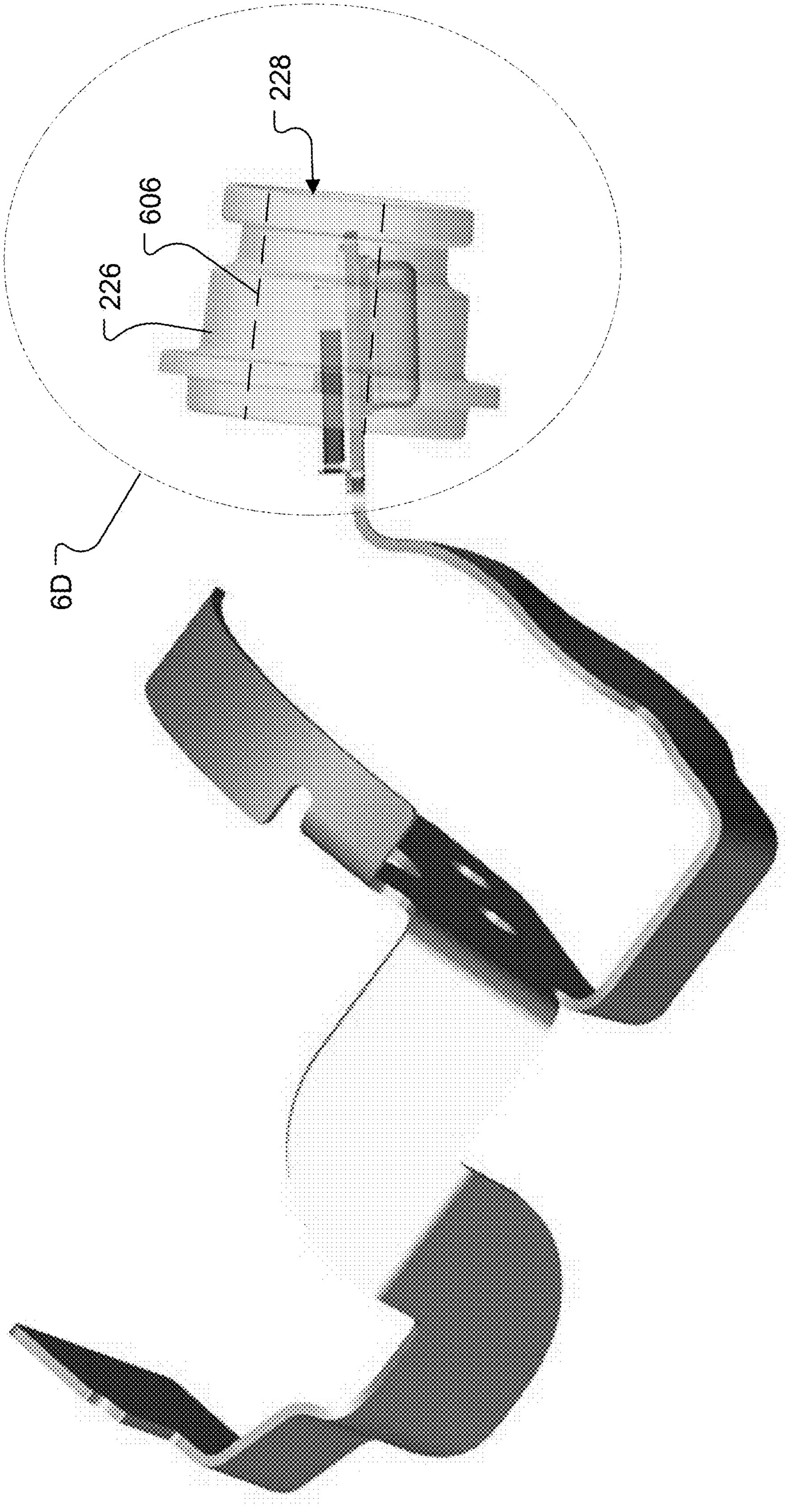
Figure 6D:
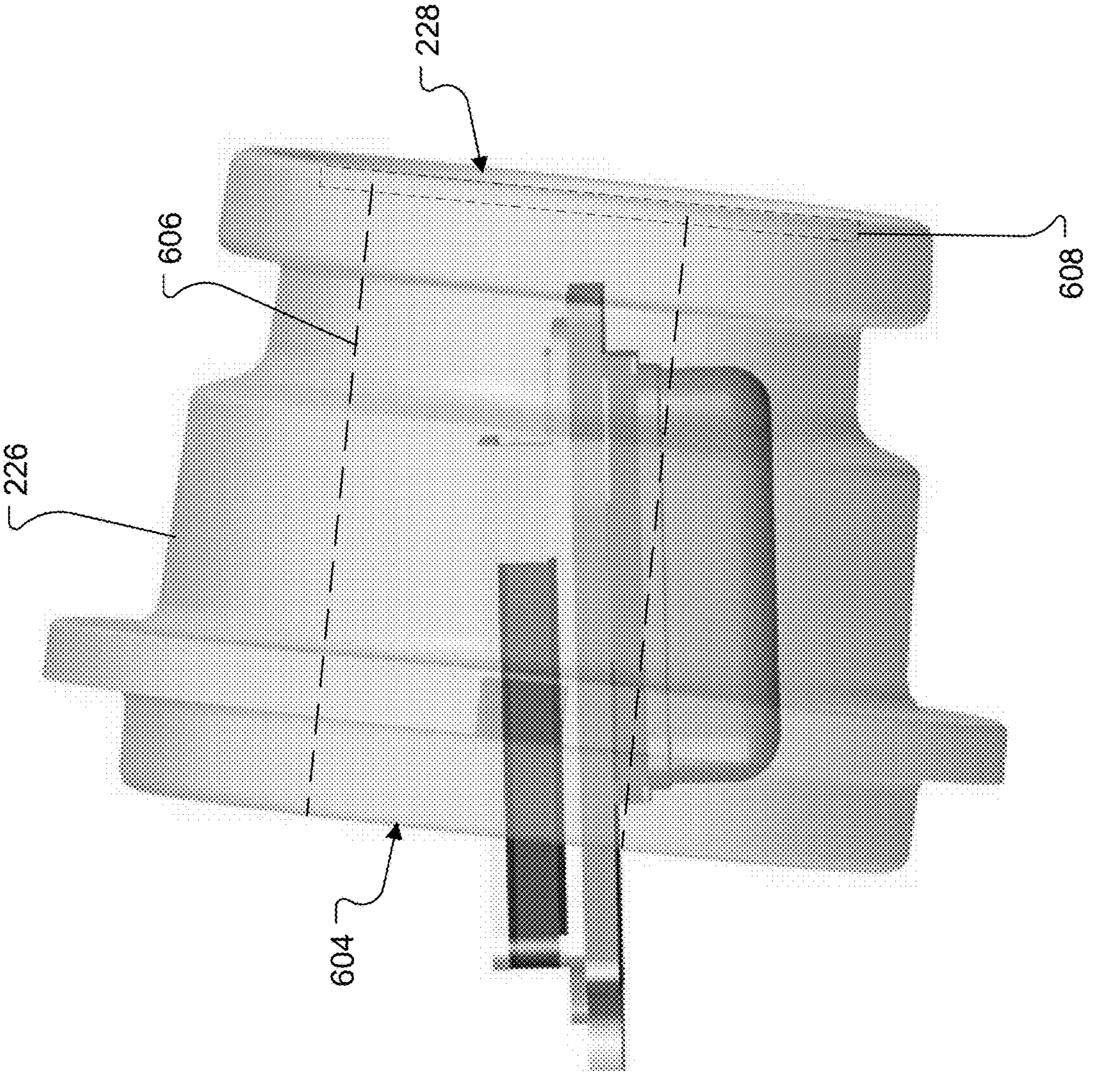
Figure 6E:
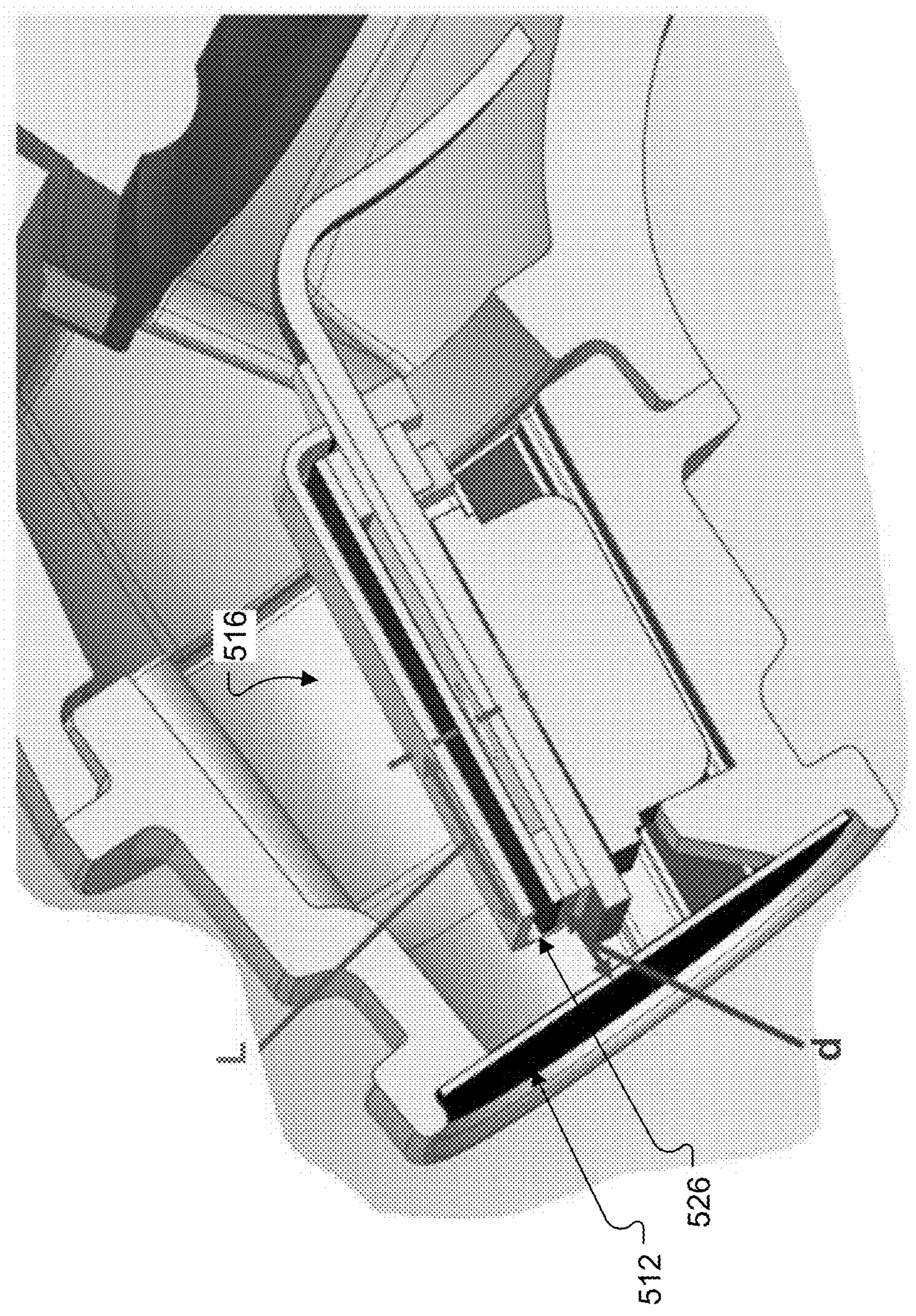
FIG. 6E is a cross-sectional view of the feedback microphone assembly in a nozzle of the earpiece of FIG. 2A.

This microphone and chimney sub-assembly is then mounted in the nozzle 226 of the earbud housing 208, as shown in FIGS. 6A-6D. The feedback microphone 230 is accommodated in a slot 600 formed in a wall 602 of the nozzle. The nozzle 226 defines the exit opening 228, an inlet opening 604, and an acoustic pathway 606 extending therebetween. The inlet opening 604 is closer to the electro-acoustic transducer 220 than the exit opening 228 and acoustically couples the first acoustic cavity 222 (FIG. 2H) to the acoustic pathway 606 such that acoustic energy radiated by the electro-acoustic transducer travels from the inlet opening 604 toward the exit opening 228. With reference to FIGS. 6B, the opening 526 faces toward the exit opening 228 of the nozzle 226. The opening 526 serves as an effective port for the feedback microphone 230. In that regard, the location of the opening 526 is closer to the exit opening 228 of the nozzle 226 than the port 506 end, and, thus, effectively moves the input to the feedback microphone 230 closer to the user's eardrum.

The opening 526 is spaced from the exit opening 228. In some cases, the opening 526 is spaced a distance (d) (FIG. 6E) between about 0.10 mm and about 0.70 mm, e.g., about 0.58 mm, away from the exit opening 228. In some implementations, a nozzle mesh 608 (FIGS. 6D & 6E) is arranged along the exit opening 228 and the opening 526 is spaced, e.g., between 0.10 mm and about 0.70 mm, e.g., about 0.58 mm, away from the nozzle mesh 608. The nozzle mesh 608 inhibits (e.g., prevents) debris from entering the nozzle 226 from the external environment.

In addition, the chimney 516 may also inhibit coupling of the electro-acoustic transducer 220 and the feedback microphone 230 if the nozzle 226 is blocked, and, thus, might help with blocked nozzle stability. If the chimney 516 is positioned close enough toward the exit opening 228 such that it is in direct contact with the mesh and the nozzle 226 is blocked, then there is the potential that, instead of increasing the coupling between the transducer 220 and the feedback microphone 230, it may, instead, decrease it, e.g., by closing off the acoustic path between the transducer 220 and the port 506 on the feedback microphone 230. That is, if the chimney opening 526 is close enough to the nozzle exit opening 228, then, if the exit opening 228 is blocked, the chimney opening 526 will also be at least partially blocked, thereby reducing acoustic coupling that could otherwise lead to instability of the feedback ANR system.

Other Implementations

Figure 7A:
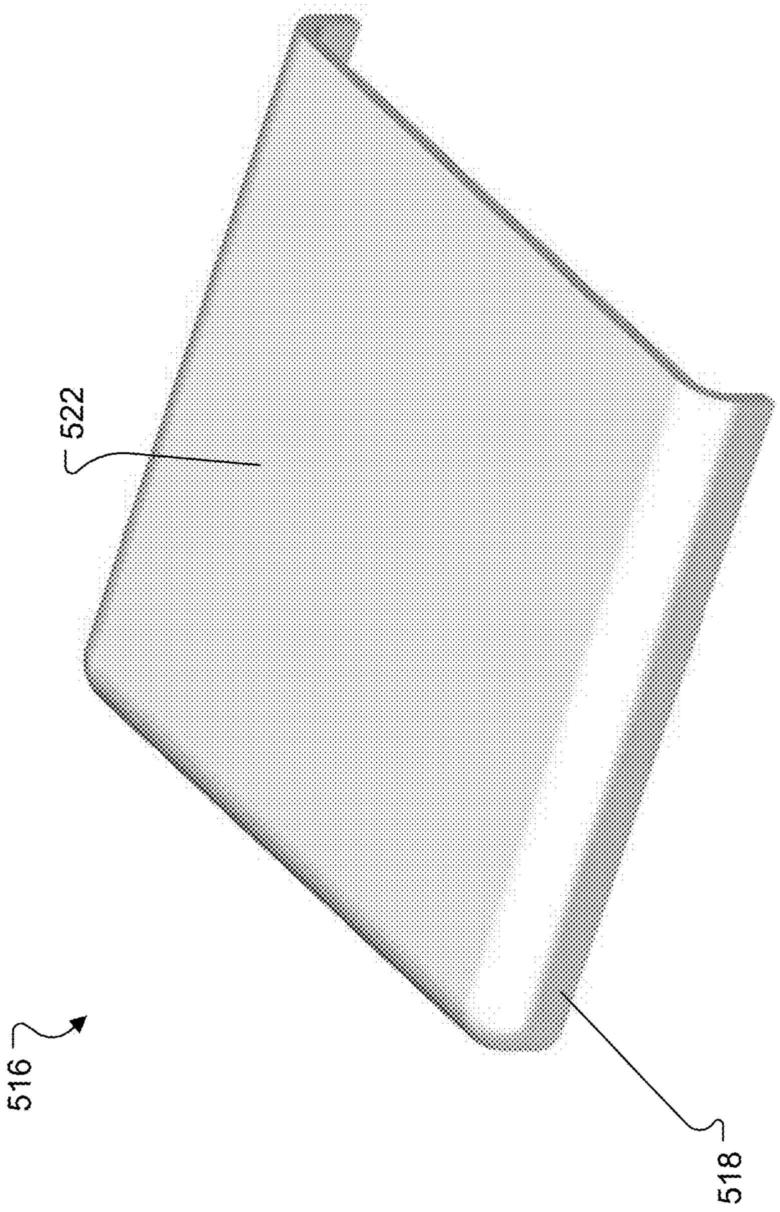
FIGS. 7A and 7B are perspective views of an alternative implementation of a chimney.
Figure 7B:
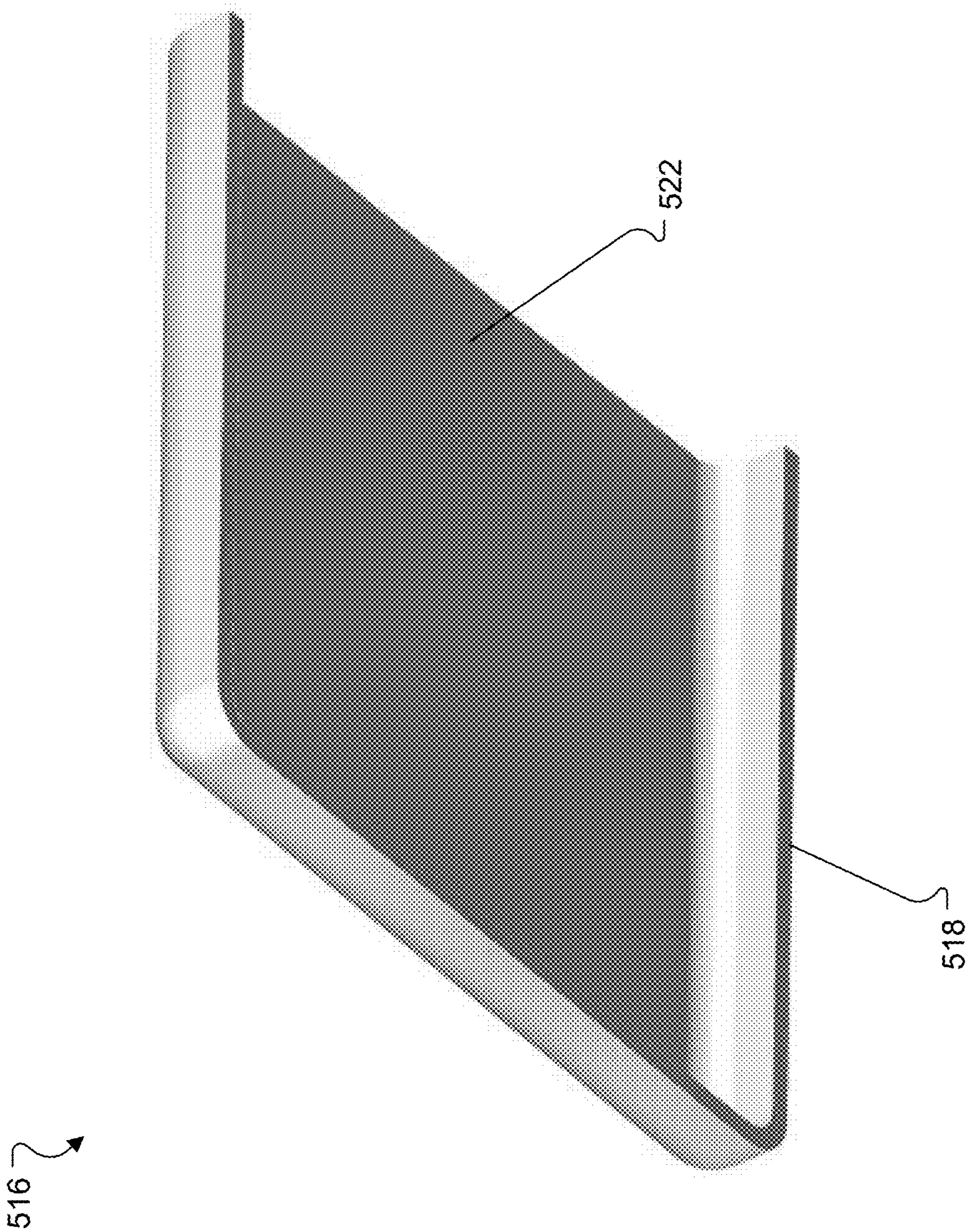

FIG. 7 illustrates another implementation of the chimney 516 in which the sidewall 518 and the top plate 522 are integrally formed. The chimney 516 may be formed of metal, such as stainless steel, and the sidewall 518 and top plate 522 may be formed via a punching process.

Figure 8:
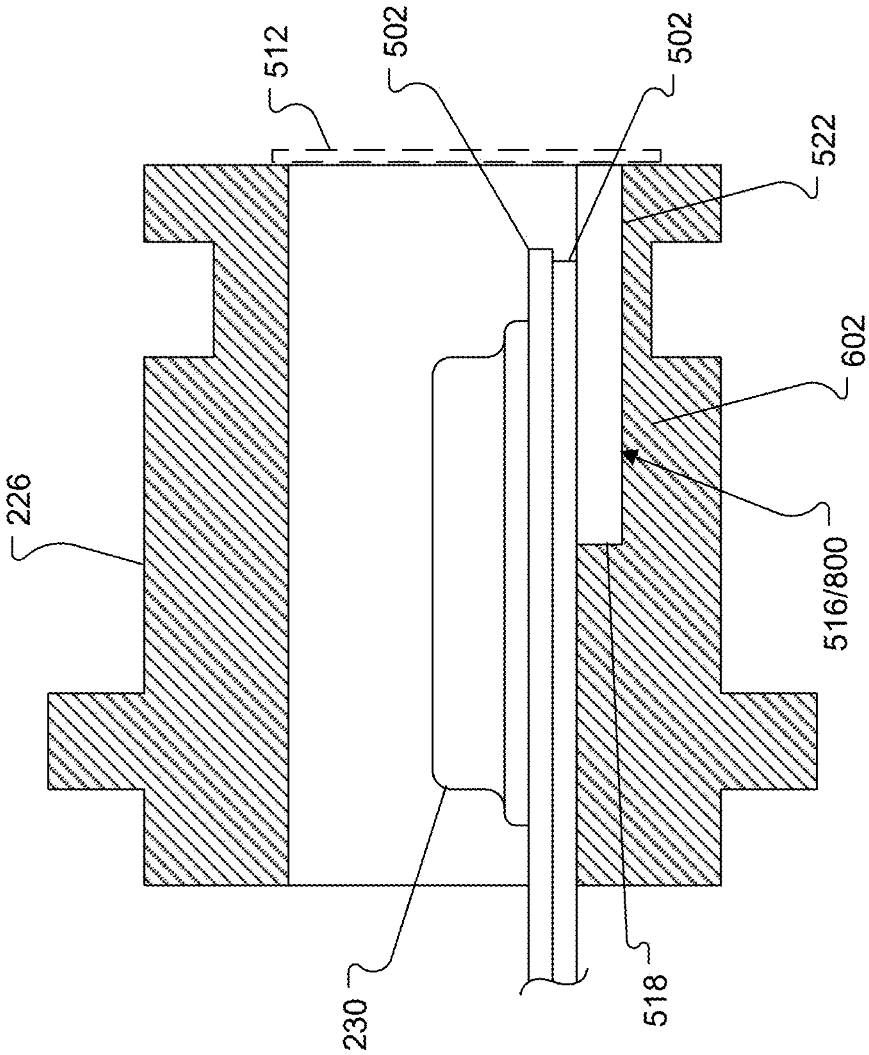
FIG. 8 is a cross-sectional side view of another alternative implementation of a chimney.

FIG. 8 illustrates an implementation in which the chimney 516 is integrated into wall of nozzle 226. In that regard, a recess 800 formed in the wall 602 of the nozzle 226 defines the sidewall 518 and top plate 522 of the chimney 516. The flexible printed circuit 502 and/or stiffener plate 508 can be secured to the nozzle 226 with a pressure sensitive adhesive (PSA) to seal the channel and form the chimney 516. The flexible printed circuit 502 and/or stiffener plate 508 may also be extended to bring it closer to the end of the nozzle 226 to reduce the spacing from the chimney 516 to the mesh 512.

In the context of feedback active noise reduction (ANR) systems, one benefit related to the inclusion of a chimney is a higher operating bandwidth for the feedback ANR system. However, in some instances, the chimney can add an acoustic propagation delay. The longer the chimney is toward the exit opening of the nozzle, the greater the acoustic propagation delay penalty. At some point, if the chimney becomes long enough, the propagation delay can reduce the operating bandwidth of the feedback ANR system and the inclusion of the chimney begins to work against itself. That is, rather than working to extend the operating bandwidth, the chimney, if it is too long, can reduce the operating bandwidth.

Figure 9:
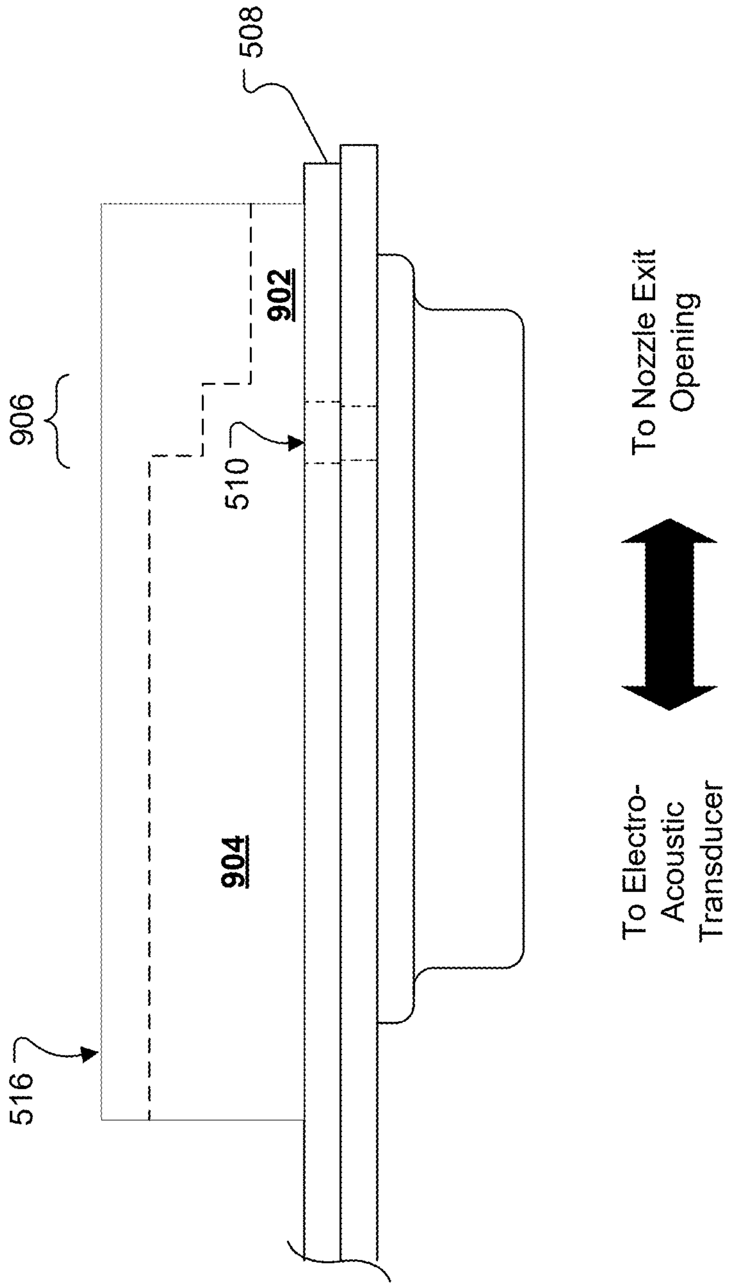
FIG. 9 is a side view of yet another alternative implementation of a chimney.

To address this, a second acoustic channel can be added to the chimney. Such a configuration is illustrated in FIG. 9. In that implementation, the chimney 516 includes a first acoustic channel 902 that, as in the implementations described above, extends from the hole 510 in the stiffener plate 508 toward the exit opening of the nozzle 226 (not shown in FIG. 9) and a second acoustic channel 904 that extends between the hole 510 in the stiffener plate 508 and the electro-acoustic transducer 220. These acoustic channels 902, 904 effectively act like two discrete microphones whose inputs are acoustically summed together. The first acoustic channel 902 will introduce a first acoustic propagation delay and the second acoustic channel 904 will introduce a second propagation delay. When the inputs from the first and second acoustic channels 902, 904 are summed, the resulting signal will have a third propagation delay that will lie somewhere between the first and second propagation delays. This configuration can enable the benefit of having the effective position of the microphone closer to the ear drum, by virtue of the first acoustic channel 902, but with less delay.

The respective cross-sectional areas and lengths of the first and second acoustic channels 902, 904 can be adjusted for balance. In some instances, it may be desirable if they are dimensioned so as to weigh the pressures the same, so it is like a straight sum (like two physical microphones). The example illustrated in FIG. 9 shows a first acoustic channel 902 that is shorter in length and has a smaller cross-sectional area as compared to the second acoustic channel 904, however, other configurations are contemplated. As shown in FIG. 9, due to the difference in cross-sectional area between the first and second acoustic channels 902, 904, there is a transition region 906 between the two acoustic channels. That transition region 906 may be stepped (as shown), sloped, or may include a complex curvature.

A number of implementations have been described. Nevertheless, it will be understood that additional modifications may be made without departing from the scope of the inventive concepts described herein, and, accordingly, other implementations are within the scope of the following claims.

What is claimed is:

1. An earpiece comprising:

an electro-acoustic transducer;

a housing enclosing the electro-acoustic transducer;

a nozzle coupled to the housing and configured to direct acoustic energy from the electro-acoustic transducer toward a user's ear canal when the earpiece is worn, the nozzle defining an inlet opening, an exit opening, and an acoustic pathway extending therebetween;

a microphone disposed within the nozzle and comprising a microphone port; and a chimney that acoustically couples the microphone port to the exit opening of the nozzle and at least partially defines an effective port for the microphone, wherein the inlet opening is closer to the electro-acoustic transducer than the exit opening such that acoustic energy radiated by the electro-acoustic transducer travels from the inlet opening toward the exit opening, wherein the effective port is closer to the exit opening than the microphone port, and wherein the effective port is spaced from an exit opening of the nozzle.

2. The earpiece of claim 1, further comprising a nozzle mesh arranged along the exit opening of the nozzle, wherein the effective port is spaced from the nozzle mesh.

3. The earpiece of claim 1, further comprising a flexible printed circuit board, wherein the microphone is mounted on a first surface of the flexible printed circuit board and the chimney is disposed along a second surface, opposite the first surface, of the flexible printed circuit board.

4. The earpiece of claim 3, further comprising a stiffener plate disposed between the second surface of the flexible printed circuit board and the chimney.

5. The earpiece of claim 4, wherein the flexible printed circuit board includes an aperture that aligns with the microphone port and the stiffener plate includes a hole that is aligned with the aperture on the flexible printed circuit board, wherein the hole and the aperture acoustically couple the microphone port to an acoustic channel defined by the chimney.

6. The earpiece of claim 4, further comprising a mesh mounted on a surface of the stiffener plate opposite the flexible printed circuit board and overlying the hole.

7. The earpiece of claim 6, wherein the chimney comprises a sidewall and a top plate, wherein the sidewall, the top plate, and the stiffener plate together define the acoustic channel and a chimney opening that acoustically couples the microphone port to the external environment outside of the housing.

8. The earpiece of claim 7, wherein the sidewall extends three-quarters around the hole in the stiffener plate.

9. The earpiece of claim 7, wherein the sidewall is U-shaped.

10. The earpiece of claim 7, wherein the sidewall is secured to the stiffener plate via a first layer of pressure sensitive adhesive.

11. The earpiece of claim 10, wherein the sidewall is secured to the top plate via a second layer of pressure sensitive adhesive.

12. The earpiece of claim 7, wherein the sidewall is integrally formed with the top plate.

13. The earpiece of claim 1, further comprising a recess formed in a wall of the nozzle, wherein the recess at least partially defines the chimney.

14. The earpiece of claim 1, wherein the nozzle is configured to receive and support a compliant eartip.

15. The earpiece of claim 1, wherein the microphone is a feedback microphone for a feedback active noise reduction (ANR) system.

16. The earpiece of claim 1, wherein the microphone is an error microphone for an adaptive feedforward active noise reduction (ANR) system.

17. The earpiece of claim 1, wherein the chimney includes a first acoustic channel that extends between the microphone port and the exit opening and a second acoustic channel that extends between the microphone port and the electro-acoustic transducer.

18. An earpiece comprising: an electro-acoustic transducer; a housing enclosing the electro-acoustic transducer; a nozzle defining an exit opening for directing acoustic energy from the electro-acoustic transducer toward a user's ear canal when the earpiece is worn through the exit opening; a microphone disposed within the nozzle and comprising a microphone port; and a chimney that acoustically couples the microphone port to the exit opening, wherein the chimney comprises a sidewall and a top plate which together at least partially define an effective port for the microphone, wherein the effective port is closer to the exit opening than the microphone port.

19. The earpiece of claim 18, wherein the top plate is substantially planar.

20. The earpiece of claim 18, wherein the sidewall and the top plate are integrally formed.

21. The earpiece of claim 18, wherein the sidewall and the top plate are secured together via adhesive.

22. The earpiece of claim 18, wherein the sidewall extends partway around a perimeter of the top plate.

23. The earpiece of claim 18, further comprising a printed circuit board, wherein the microphone is mounted along a first surface of the printed circuit board and wherein the chimney is mounted along a second, opposite surface of the printed circuit board.

24. The earpiece of claim 23, wherein the circuit board is a flexible printed circuit board.

25. The earpiece of claim 24, further comprising a stiffener plate disposed along the second surface of the flexible printed circuit board, wherein the chimney is mounted on the stiffener plate.

* * * * *